(12) United States Patent
Meyers et al.

(10) Patent No.: US 8,149,268 B1
(45) Date of Patent: Apr. 3, 2012

(54) SYSTEM AND METHOD FOR DETERMINING THREE-DIMENSIONAL INFORMATION FROM TWO-DIMENSIONAL IMAGES

(75) Inventors: Ronald Everett Meyers, Columbia, MD (US); David Lawrence Rosen, Rockville, MD (US); Keith Scott Deacon, Columbia, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 64 days.

(21) Appl. No.: 12/940,240

(22) Filed: Nov. 5, 2010

(51) Int. Cl.
*H04N 13/00* (2006.01)

(52) U.S. Cl. ........................................ 348/42
(58) Field of Classification Search ............ 348/42
See application file for complete search history.

(56) References Cited

U.S. PATENT DOCUMENTS

| | | | |
|---|---|---|---|
| 2007/0041008 A1* | 2/2007 | Aufmuth et al. | 356/237.2 |
| 2008/0212838 A1* | 9/2008 | Frigerio | 382/107 |

OTHER PUBLICATIONS

Hoffmann, A., et al. " Ground-based lidar measurements from Ny-Ålesund during ASTAR 2007: a statistical overview," Atmos. Chem. Phys. Discuss. 9, 15453-15510, (2009).www.atmos-chem-phys-discuss.net/9/15453/2009/.

Miyazaki et al., "Determinina surface orientations of transparent objects based on polarization degrees in visible and infrared wavelengths,"vol. 19, No, 4/J. Opt, Soc. Am, A p. 687-694 (Apr. 2002).

Cremer et al., "Infrared polarisation measurements of surface and buried anti-personnel landmines,"Poceedings of SPIE vol. 4394, p. 164-175 (2001).

Diner, D., et al., "Multi-angle Imaging SpectroRadiometer (MISR) Instrument Description and Experiment Overview," Transactions on Geoscienceand Remote Sensing, 38(#4) 1072-1087 (Jul. 1998).

Fatale, et al., "New Initiatives in Natural Environmental Characterization for the Objective Force," United States Military Academy, 1-2 (Sep. 4, 2003).

Horn, et al., "Determining Optical Flow" MIT Artificial Intelligence Laboratory Memo, 572, 1-27 (1980).

McKinley, C., "When the Enemy Has Our Eyes," School of Advanced Power Studies (Jun. 1996).

Narasimhan et al. "Contrast Restoration of Weather Degraded Images"IEEE Transactions on Pattern Analysis and Machine Intelligence, vol. 25, 713-724, 2003.

Preetham et al. "A Practical Analytic Model for Daylight. Computer Graphics" Proceedings of SIGGRAPH 1999, 91-100 (Aug. 1999).

Preetham "Modeling Skylight and Aerial Perspective" www.atLcomJdeveloperISfGGRAPH03f PreethamSig2003CourseNotes.pdf, accessed Sep. 5, 2003.

(Continued)

*Primary Examiner* — Jay Au Patel
*Assistant Examiner* — Richard Torrente
(74) *Attorney, Agent, or Firm* — Laurence E. Anderson

(57) ABSTRACT

A system and method of determining three-dimensional data for an object by performing optical flow analysis to calculate surface profile analysis for a group of monocular component images that vary wavelength distribution, and determining three-dimensional data relating to the object from the component images and the surface profile analysis. Stereo image features are obtained from a single monocular polychromatic raw image or multiple monocular grayscale images having known spectral imaging collection data. Apparatus are described which allow three-dimensional data for an object to be determined from one or more two-dimensional images of the object.

20 Claims, 7 Drawing Sheets

OTHER PUBLICATIONS

Siegal. et af. "Just Enough Reality: Comfortable 3-D Viewing via Microstereopsis" IEEE Transactions on Circuits and Systems for Video Technology 10(3), 387-396 (Apr. 2000).

Yu, Yizhou, et al, "Recovering Photometric Properties of Architectural Scenes From Photographs," SIGGRAPH '98 Proceedings of the 25th annual conference on Computer graphics and interactive techniques ACM New York, NY, USA© 1998 ISBN:0-89791-999-8 doi>10.1145/280814.280874 pp. 207-217 (1998).

Gian Paolo Gobbi et al.,"Altitude-resolved properties of a Saharan dust event over the Mediterranean," Atmospheric Environment 34, 5119-5127 (2000).

Lee. R. Moyer, "Counter Concealed Target Technologies," DARPATech2000 (Sep. 6-S, 2000)www.darpa.mil/darpatech2000 IPresentations ISPO-pdfl 4MoyerCCTB& W. pdf.

Tianshu Liu, "Geometric, Kinematic and Radiometric Aspects of Image-Based Measurement" AIAA 2002-3239, (22nd AIAA Aerodynamic Measurement Technology and Ground Testing Conference Jun. 24-26, 2002) p. 16.

Matt Young, Optics and Lasers (Springer, 1977) pp. 43-72.

John David Jackson, Classical Electrodynamics 3rd Ed, (Wiley, 1999) pp. 300-306.

Grant R. Fowles, "Introduction to Modern Optics," 2nd Ed. (Holt, Rheinhart, and Winston, 1975) pp. 43-46.

Driscoll, W.G., Handbook of Optics, McGraw-Hill Book Co., (1978) pp. 14-1, 14-2, 14-39, 14-52 to 14-58, and 15-1 to 15-9.

Michael J. Rigo, Hyperspectral Polarimetry for Satellite Remote Sensing, United States Naval Academy Thesis (1998) (Abstract only).

Ellias, T. et al. "Exploring the Potential of Combining Column Integrated Atmospheric Polarization with Airborne in situ size Distribution Measurements for the Retrieval of an Aerosol Model: a Case Study of a Biomass Burning Plume during SAFARI 2000." J. Geophys. Res., vol. 108 No. D13 Date: Jul. 16, 2003 pp. SAF44-1-16.

Coulson, Kinsell L., Polarization and Intensity of Light in the Atmosphere (A. Deepak Publishing, Hampton, VA 1988) pp. 272-291.

Unmanned Aerial Vehicle Roadmap 2000-2025, Office of the Secretary of Defense, dated Apr. 2001, pp. 26-29.

Koenderink, Jan J., "Bidrectional Reflection Distribution Function Expressed in Terms of Surface Scattering Modes," ECCV '96. 4th European Conference on Computer Vision Proceedings, vol. 2, p. 28-39 (1996).

Mishchenko, M., et al., "Light Scattering by Nonspherical Particles, Theory, Measurements and Applications" Academic Press, 2000, pp. 393-416.

Baertlein, B. "Infrared/Hyperspectral Methods" (Paper I) RAND Report MR1608, Ohio State University p. 93-110 (2003) www.rand.org/publications/MR/MR1608/MR1608.appc.pdf.

A. Rogalski and K. Chrzanowski, "Infrared Devices and Techniques" Infrared Handbook of Optoelectronics (Two-Volume Set) Edited by Robert G . W . Brown and John P Dakin Taylor & Francis 2006 pp. 653-691.

Saleh, B.E. Fundamentals of Photonics (Wiley, 1991) p. 205.

Miyazaki, D., et al. "Transparent: Surface Modeling form a Pair of Polarization Images," IEEE Transactions on Pattern Analysis and Machine Intelligence, vol. 26, No. 1, Jan. 2004., pp. 783-782.

Lee, Raymond "Digital imaging of clear-sky polarization," Appl. Opt. 37, 1465-1476 (1998).

Howe, James D "Polarization sensing for target acquisition and mine detection," SPIE 4133, 202-213 (2000).

Jose R. A. Torreaõ and Joaõ L. Fernandes "Matching photometric-stereo images" J. Opt. Soc. Am. A/ vol. 15, No. 12/ -p. 2966-75 (Dec. 1998).

Jose R. A. Torrea õ, "Natural Photometric Stereo?" Anais do IX SIBGRAPI, outubro de (Oct.) 1996.

Nayar, S.K., et al. "Generalization of the Lambertian model and implications for machine vision," International Journal of Computer Vision, vol. 14, pp. 227-251, 1995.

Westund Harold B. The Role of Rendering in the Competence Project in Measurement Science for Optical Reflection and Scattering, n J. Res. Natl. Inst. Stand. Technol. 107, 247-259 (2002).

Alison Rodger and Bengt Norden, "Circular Dichroism and Linear Dichroism" (Oxford, 1997) pp. 45-89.

G.P. Gobbi, F. Barnaba, M. Blurnthaler, G. Labow, and J.R. Herman, "Observed effects of particles nonsphericity on retrieval of marine and desert dust aerosol optical depth by lidar," Atmospheric Research 61, 1-14 (2002).

Mishchenko, Michael, Scattering, Absorption, and Emission of Light by Small Particles (Cambridge, 2002) pp. 8-30 and 100.

Smith, Matthew, et al., "Multispectral infrared Stokes imaging polarimeter" (Proceedings Paper) in Polarization Measurement, Analysis, and Remote Sensing, ed. D. H. Goldstein and D. B. Renault, Proceedings of SPIE V. 3754 (1999).

Smith, Matthew, et al., "Beam Wander Considerations in Imaging Polarimetry," in Polarization: Measurement, Analysis, and Remote Sensing II, D. H. Goldstein, D. B. Chenault, eds., Proceedings of SPIE 3754, 50-54 (1999).

Shaw, Joseph, "Degree of linear polarization in spectral radiances from water-viewing infrared radiometers," Appl. Opt. 38(15), 3157-3165 (1999).

Obukhov, A.M., et al. Polarization of the Twilight Sky: Measurements, Empirical Model, Radiative Transfer Simulation and Application to Aerosol Profile Retrieval, II ovp@omega.ifaran.ru. ugol@tanatos.asc.rssi.ru (2003).

Swap, Robert R., "Africa burning: a thematic analysis of Southern African Regional Science Initiative-Safari," J. Geophys. Res. submitted (2003).

Shaw, Joseph A. "Polarized infrared emissivity for a rough water surface," Opt. Exp. 7, 25342 (2000).

Acharya, K. et al. "MODTRAN4: Multiple Scattering and Bi-Directional Reflectance Distribution Function (BRDF) Upgrades to MODTRAN," SPIE Proc. 3756, 1-9 (1999).

Berk, A. "MODTRAN Radiative transfer modelling for atmospheric correction," JPL Report 1-7 (1999) paper was published in the SPIE Proceeding, Optical Spectroscopic Techniques and Instrumentation for Atmospheric and Space Research III, vol. 3756, Jul. 1999.

Meyers, Jason, "Modeling Polarimetric Imaging using DIRSIG", RIT Imaging Science Ph.D. thesis (Chester F. Carlson Center for Imaging Science Rochester Institute of Technology, 2002).

Kim, A.D. et al. "Influence of the relative refractive index on the depolarization of multiply scattered waves," Physical Review E, vol. 64, 026612 published Jul. 24, 2001.

Lu, S-Y, "Interpretation of Mueller matrices based on polar decomposition," J. Opt. Soc. Am. A/vol. 13, No, 5/May 1996 p. 1106.

Pierre-Yves Gerligand, et al. "Polarimetric images of a cone," Optics Express 420-430 (1999).

Chipman, Russell, "Polarization analysis of Optical Systems," Optical Engineering 28, 090-099 (1989).

Meyers, Jason, P. et al. "Incorporation of polarization into DIRSIG synthetic image generation model," SPIE 4816,132-143 (2002).

Kenneth K. Ellis, "Polarimetric bidirectional reflectance distribution function of glossy coatings," J.Opt.Soc.Am, 13, 1758-1762 (1996).

Karavas, Panagiotis "Validation/Evaluation of Polarization Version of SEARAD," MS thesis (Hellenic Naval Academy, 1999).

Lagarass, Spiridan, Modeled Detection and Recognition Range for a Polarization Filtered FLIR Sensor, (MS thesis, Helenic Naval Academy, 1999).

Yong, Tan C., "An Infrared Model of R/V Point SuR Using EOPACE Data," Report A156163 (Naval Postgraduate School, 1999).

Cooper, W.A., "Infrared polarization measurements of ship signatures and background contrast" (Proceedings Paper) SPIE 2223, 300-309 (1994).

Burton, Robin, et al, "Elastic LADAR Modeling for Synthetic Imaging Applications," SPIE, vol. 23, No. 13, pp. 144-155 (2002).

Lentilucci, Emmerr J. et al. "Advances in Wide Area Hyperspectral Image Simulation,"presented at SPIE AeroSense 2003, SPIE vol. 5075-13 pp. 110-121 (2003).

Arnold, Peter S. "Hyperspectral Simulation of Chemical Weapons Dispersal Patterns in DIRSIG" (Digital Imaging and Remote SensingLab, Rochester Institute of Technology, 2003).

"Nonconventional Exploitation Factors (NEF) Modeling," Computer Graphic Rendering of Material Surfaces,Website http://math.nist.gov/~FHunt/appearance/nefds.html (est. 2003).

Merino, Oscar Gonzalez "Image analysis of Infrared Polarization measurements of landmines," (VRIJE Universiteit Brussel, Universitat Politecnica, De Catalunya)(Masters Thesis 2001).

Rogne, Timothy J. "Passive Target Detection using Polarized Components of Infrared Signatures," SPIE 1317, 242-251(1990).

Sadjadi, Firooz A. Application of a Passive Polarimetric Infrared Sensor in Improved Detection and Classification of Targets, II International Journal of Infrared and Millimeter Waves 19, 1541-1559 (1998).

Sadjadi, Firooz A. "Automatic target recognition using polarization-sensitive thermal imaging," Proc. SPIE 2485, 353 (1995); doi:10.1117/12.213102.

Chun, C.S. "Polarization-Sensitive Thermal Imaging Sensors for Target Discrimination," SPIE 3375, 326-336 (1998).

W. de Jong, et al. "Usage of polarization features of landmines for improved automatic detection," Proc, SPIE 4038, 241-252 (2000).

Cremer, Frank "Infrared polarization measurements and modeling applied to surface-laid antipersonnel landmines," Opt. Eng. 41, 1021 (2002); doi:10.1.117/1.1467362.

Schechner, Yoav Y. "Polarization-based vision through haze," AppL Opt. vol. 42, No. 3, 511-525 (Jan. 20, 2003).

Schmitt, J.M. "Use of polarized light to discriminate short-path photons in a multiply scattering medium," AppL Opt. 31 (#30) 6535-6546 (Oct. 20, 1992).

Tooley, Richard D. "Man-made detection using infrared polarization," SPIE 1166, 52-58 (1989).

Westlund Harold B, et al. "A BRDF Database Employing the BeardMaxwell Reflection Model," (University of Oregon) accessed Jul. 21, 2003).

Koenderink, J..J. "Bidirectional reflection distribution function expressed in terms of surface scattering modes," ECCV '96. 4th European Conference on Computer Vision Proceedings, vol. 2, pp. 28-39.

Priest, Richard G. et al., "Polarimetric BRDF in the Micofacet Model" Proceedings of the 2000 Meeting of the Mitary Sensing Symposia Specialty Group on Passive Sensors: Theory and Measurements,l, 169-181 (2000).

Kato, Seiji et al. "A Comparison of Modeled and Measured Surface Shortwave Irradiance For a Molecular Atmosphere", J. Quant. Spectrosc. Radiat. Transfer vol.'61, 493-502 (1999).

Smith, Warren J. "Modern Optical Engineering" ed. 3 (McGraw-Hill, 2000) p. 200.

Germer, Thomas, et al. "Modeling the appearance of special effect pigment coatings," SPIE 4447, 77-86 (2001).

Vosilla, John ,"Northrop Grumman's E-2C Marks Successful First Live-Fire Test of Ballistic Missile Sensor," Northrop Grumman Press Release (Aug. 20, 2001).

Ackenhusen, L. "Infrared/Hyperspectral Methods" [for Landmine Detection}, in Alternatives for Landmine Detection (White House Office of Science and Technology Policy and Rand Science and Technology Policy institute, to appear Mar. 2003) pp. III-125.

Hackwell J.A. et al. "LWIR/MWIR Imaging Hyperperal Sensor for Airborne and Ground-Based Remote Sensing," SPIE Proceedings, vol. 2819, 1996.

Lacombe, "Environmental Influences of Thermal Signatures of Buried Land Mines," U.S. Army, Fact Sheet, Apr. 1999.

* cited by examiner

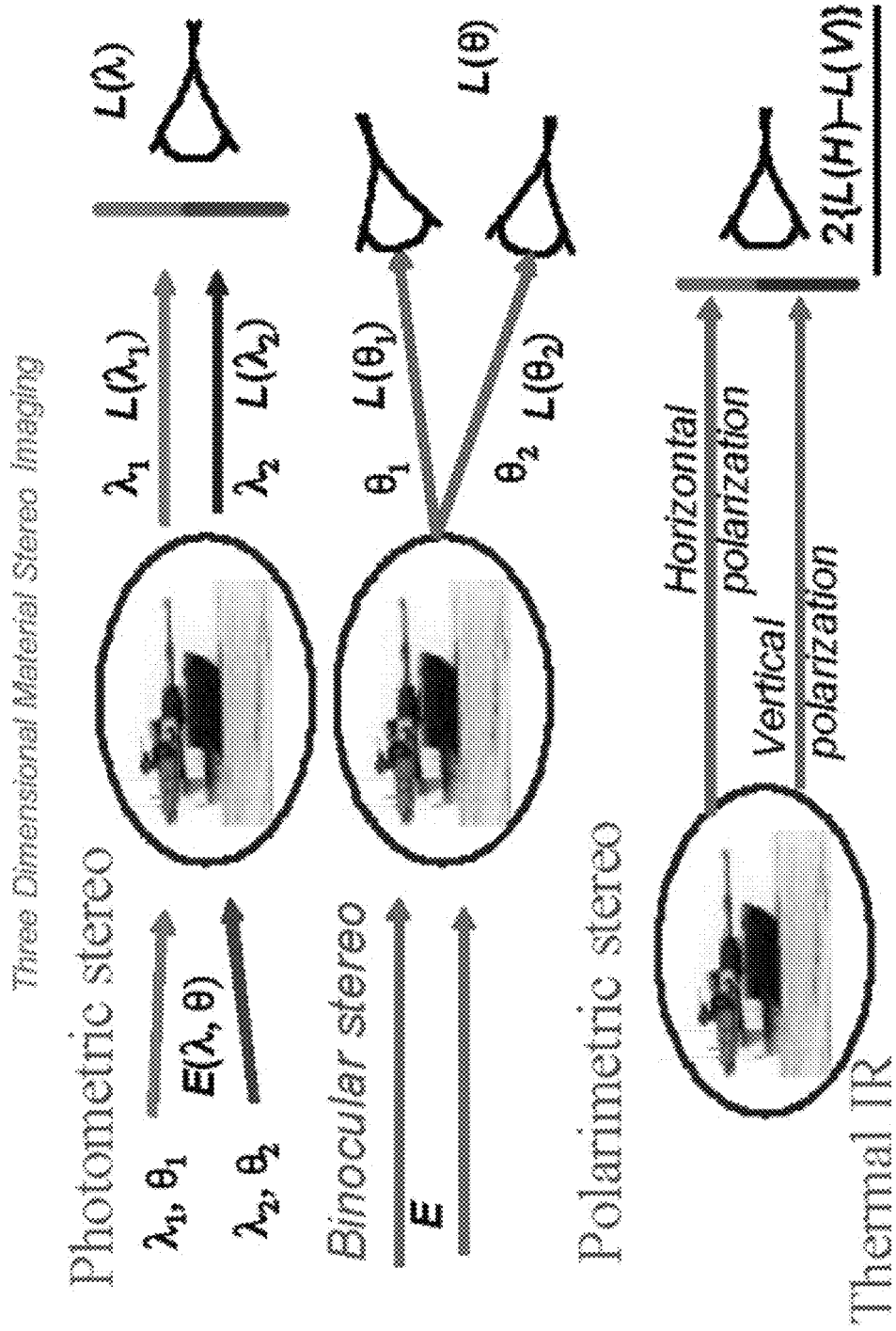
Figure 5 Using photometric stereo (top), binocular stereo (middle) and polarimetric stereo (bottom) techniques.

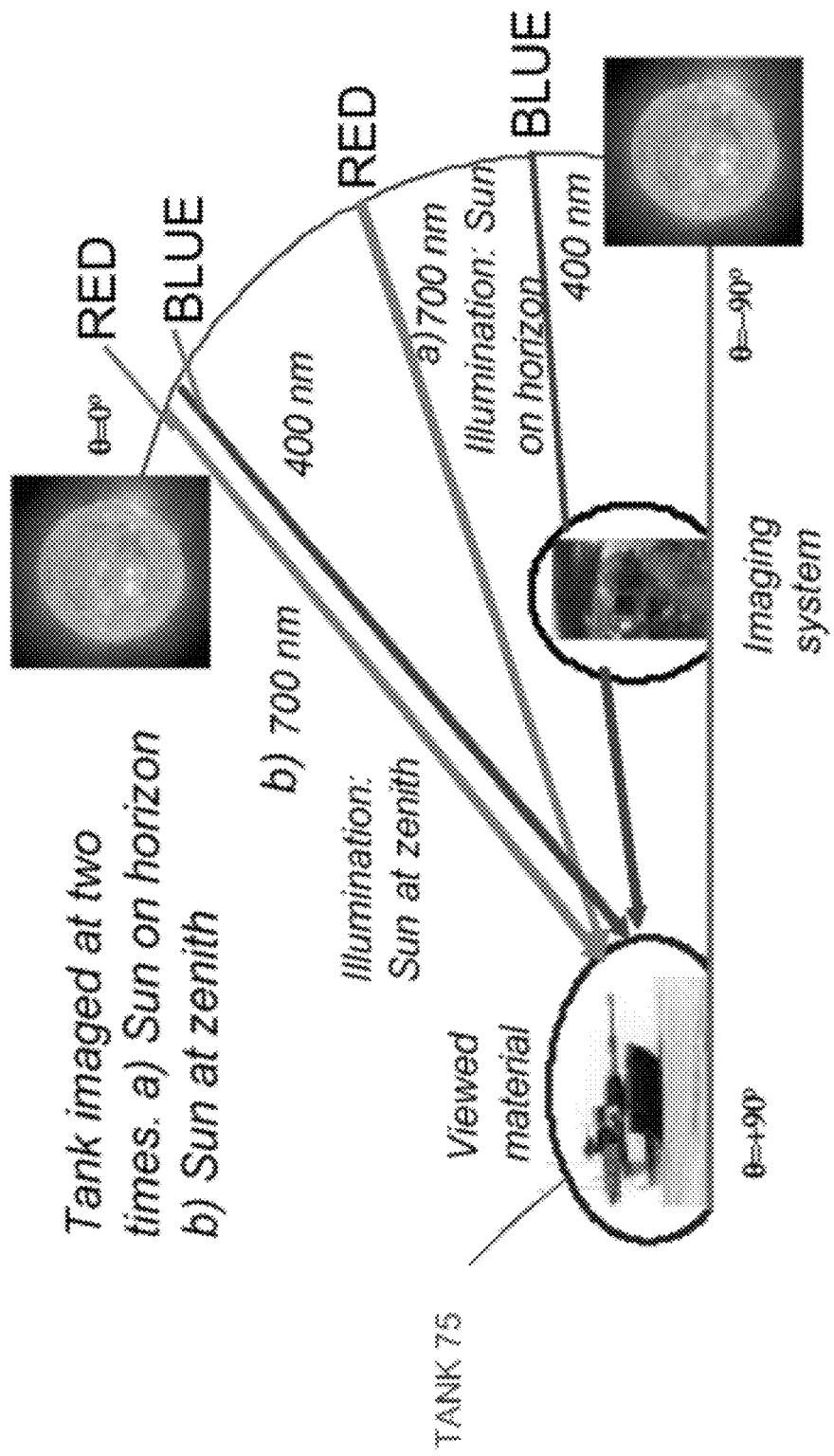
FIG. 6 A tank being imaged by an imaging system at two wavelengths ([blue] 400nm and [red] 700 nm) and two different times of the day ([a] sun is at the horizon and [b] sun is at the zenith).

SYSTEM AND METHOD FOR DETERMINING THREE-DIMENSIONAL INFORMATION FROM TWO-DIMENSIONAL IMAGES

GOVERNMENT INTEREST

The invention described herein may be manufactured, used, and licensed by or for the United States Government.

CROSS REFERENCE TO RELATED APPLICATIONS

This application is related to U.S. application Ser. No. 12/940,204 entitled "SYSTEM AND METHOD FOR DETERMINING THREE-DIMENSIONAL INFORMATION FROM PHOTOEMISSION INTENSITY DATA," invented by Ronald Meyers and David Rosen, filed on even date herewith and hereby incorporated by reference, and U.S. application Ser. No. 12/940,228 entitled "SYSTEM AND METHOD FOR MEASURING DEPOLARIZATION," invented by David Rosen and Ronald Meyers, filed on even date herewith and hereby incorporated by reference.

FIELD OF THE INVENTION

The present invention relates to apparatus and methods for determination of three-dimensional data, in particular to determining three-dimensional data from one or more two-dimensional images.

BACKGROUND OF THE INVENTION

Generally speaking, binocular stereo imaging requires at least two viewpoints, which may need to be spatially distant from one another for large distances between a viewer and an object.

Photographs taken by satellite can be obtained over the interne, revealing a great deal of information in a two-dimensional format. However, obtaining three-dimensional information is useful in such areas as agricultural forecasting, environmental monitoring, forensics, intelligence gathering, object detection (including detection of camouflaged objects using three-dimensional data), target acquisition, remote mapping, and the like.

The unaided eye partially uses photometric stereo methods of depth profiling, in addition to binocular stereo methods, to acquire depth perception. Realistic presentation of images as perceived by the unaided eye is needed in visualization software and training material, which therefore should include photometric stereo information in addition to binocular stereo information. Photometry relates to the measurement of light, in terms of its perceived brightness to the human eye, as distinguished from radiometry, which is the science of measurement of radiant energy (including light) in terms of absolute power. In photometry, the radiant power at each wavelength is weighted by a luminosity function (a.k.a. visual sensitivity function) that models human brightness sensitivity. Photometric stereo, as used herein, is a technique in computer vision for estimating the surface normals of objects by observing that object under different lighting conditions. A surface depth profile value can be calculated when using stereo methods.

Methods relating to the determination of depth and/or surface depth profile from the optical field are described in J. R. A. Torreão, "Natural Photometric Stereo," Anois do IX Sibgrabi, 95-102 (October 1996) and J. R. A. Torreão and J. L. Fernandes, "Matching photometric stereo images", J. Opt. Soc. Am., A15(12), 2966-2975, (1998), both of which are hereby incorporated by reference.

The article entitled "Natural Photometric Stereo" discusses the human brain's ability to infer shape from the binocular fusion of some kinds of monocular images. Photometric stereo (PS) images have been observed which are monocular images obtained under different illuminations, that produce a vivid impression of depth, when viewed under a stereoscope. According to the article, the same is true of pairs of images obtained in different spectral bands. The "Natural Photometric Stereo" discusses employing an optical-flow based photometric stereo algorithm; a type of "colour" separated images, which have been so produced as to emulate the kinds of records generated by the photosensitive cells in the human retina, to obtain depth estimates from them. The "Natural Photometric Stereo" article speculates on the possibility that a process similar to PS could work on the human visual system. A natural photometric stereo process is postulated in the "Natural Photometric Stereo" article, invoking some physical and biological arguments, along with experimental results, in support thereof.

In the article entitled "Matching photometric stereo images," a process of shape estimation is introduced through the matching of photometric-stereo images, which are monocular images obtained under different illuminations. According to the "Matching photometric stereo images" article, if the illumination directions are not far apart, and if the imaged surface is smooth, so that a linear approximation to the reflectance map is applicable, the disparities produced by the matching process can be related to the depth function of the imaged surface through a differential equation whose approximate solution is can be found. The "Matching photometric stereo images" article presents a closed-form expression for surface depth, depending only on the coefficients of the linear-reflectance-map function. If those coefficients are not available, a simple iterative scheme still allows the recovery of depth, up to an overall scale factor.

Various articles have been written on the spatial arrangement of objects and depth perception. In the publication by B. K. P. Horn and B. G. Schunk, "Determining Optical Flow", MIT Artificial Intelligence Laboratory, 572, 0-27 (1980)(Horn and Schunk article), hereby incorporated by reference, there is a description of a method for finding optical flow, which is defined in the Horn and Schunk article as:

Optical flow is the distribution of apparent velocities of movement of brightness patterns in an image. Optical flow can arise from relative motion of objects and the viewer [citation omitted]. Consequently, optical flow can give important information about the spatial arrangement of the objects viewed and the rate of change of this arrangement [citation omitted].

Discontinuities in the optical flow can help in segmenting images into regions that correspond to different objects.

According to the Horn and Schunk article, in general optical flow cannot be computed locally, since only one independent measurement is available from the image sequence at a point, while the flow velocity has two components. A second constraint is needed. A method for finding the optical flow pattern is presented in the Horn and Schunk article which assumes that the apparent velocity of the brightness pattern varies smoothly almost everywhere in the image. An iterative implementation is shown which successfully computes the optical flow for a number of synthetic image sequences. The algorithm used in Horn and Schunk article reportedly can handle image sequences that are quantized rather coarsely in space and time and is, reportedly, insensitive to quantization of brightness levels and additive noise. Examples are included where the assumption of smoothness is violated at singular points or along lines in the image.

In light of the above, there exists a need to obtain three-dimensional information about an object from existing two-dimensional images, such as photographic prints, without the need to return to a given viewpoint to obtain further information.

SUMMARY OF THE INVENTION

A method of determining three-dimensional data for an object by performing optical flow analysis to calculate surface profile analysis for a group of monocular component images that vary wavelength distribution, and determining three-dimensional data relating to the object from the component images and the surface profile analysis. Stereo image features are obtained from a single monocular polychromatic raw image or multiple monocular grayscale images having known spectral imaging collection data. The surface depth profile (also termed herein surface height profile) of the object relative to an image plane or illumination vectors for the object provides three-dimensional object data in a raw image. The raw monocular image is input by scanning a photograph, receiving a video signal, or receiving the image from an imaging device. The method optionally includes color correction, or adjusting the wavelength distribution of the image using a correction factor to refine stereo image quality. The correction factor is optionally correlated with the identity of the imaging device, or a recording medium. Image formation data (identity of imaging device, ambient conditions during imaging, and the like) are provided with the image, and may include a correction factor or allow one to be determined. Color correction may also use the known properties of object(s) within the image. The three-dimensional data is used in an improved method of object recognition by providing a stereo image of the object.

An apparatus for determining a three-dimensional data relating to an object from an image of the object includes an image input (such as an optical scanner). An image decomposer decomposes the image into a plurality of component images (for example, an algorithm or plurality of optical filters), an optical flow calculator operating on a computer determines optical flow data from the component images, and a three-dimensional data calculator algorithm operating on the computer calculates the three-dimensional data from the optical flow data. The apparatus optionally includes an image corrector, such as an optical filter modifying the image input, or a software correction using an algorithm. The correction factor used may be retrieved from a memory device (such as a database) based on image formation data. The apparatus may further comprise an output device, such as a visual display or a data communications device.

BRIEF DESCRIPTION OF THE DRAWINGS

FIG. 5 illustrates, diagrammatically, using photometric stereo (top), binocular stereo (middle) and polarimetric stereo (bottom) techniques.

FIG. 6 illustrates a tank being imaged by an imaging system at two wavelengths ([blue] 400 nm and [red] 700 nm) and two different times of the day ([a] sun is at the horizon and [b] sun is at the zenith).

DESCRIPTION OF THE PREFERRED EMBODIMENTS

Figure 1:
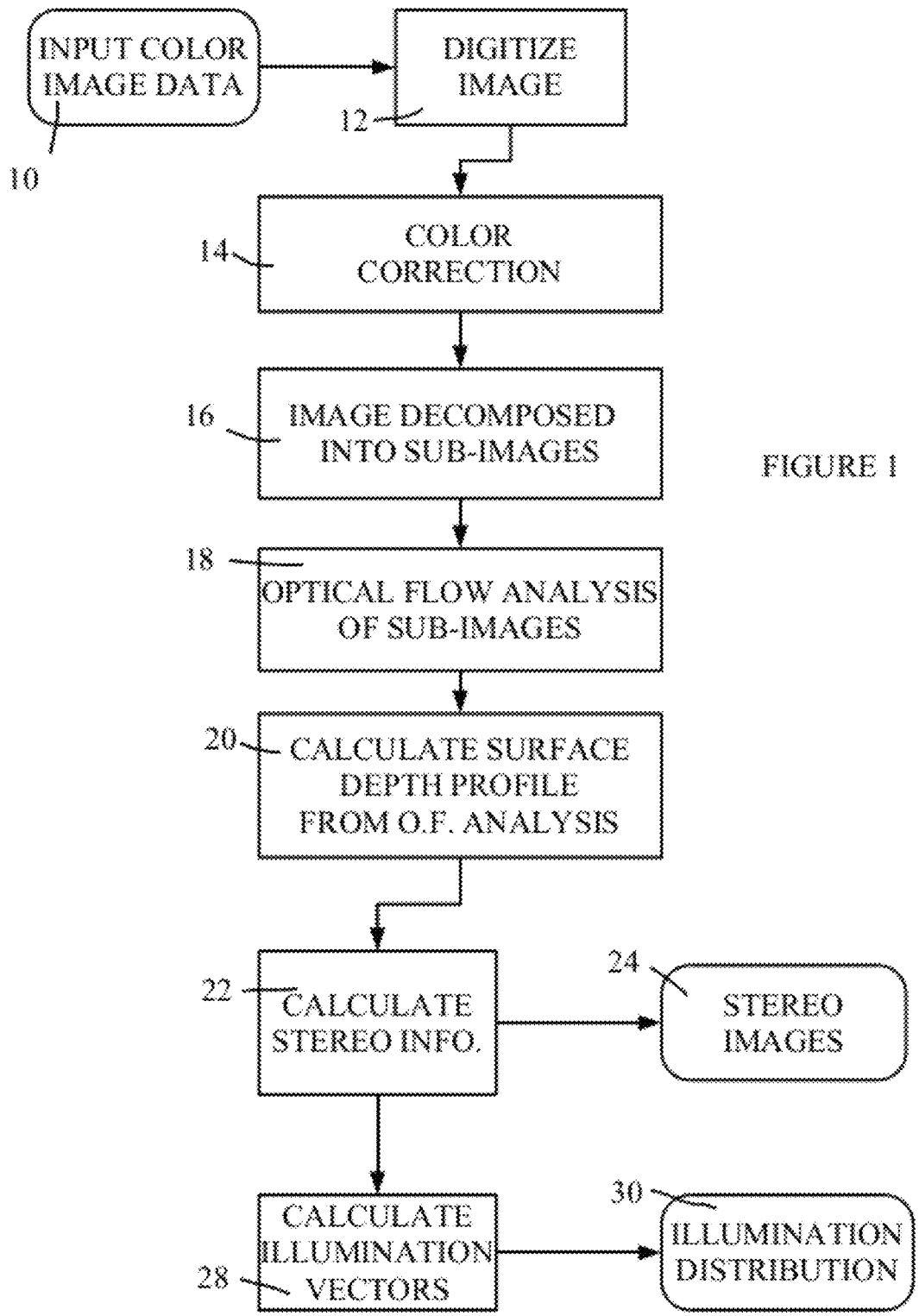
FIG. 1 is a flowchart for photometric analysis of a color image, to obtain three-dimensional information from a two-dimensional image.

The present invention has utility as a method and apparatus for extracting three-dimensional data from one or more two-dimensional images.

Monocular images, such as previously recorded photographs, are analyzed using methods according to the present invention, allowing three-dimensional information to be extracted from an image even if it was recorded at a previous time with no intention of recording any three-dimensional data. The information extracted does not have to be real-time, as in some computer-vision applications of photometry, and need not be used for immediate evaluation of three-dimensional shape.

For example, stereo images derived from a monocular color photograph, such as a picture postcard, could be used with this invention for stereo image analysis and stereo map making. A picture postcard is generally not intended as a stereo map of the landscape, but the photometric techniques described herein allow extraction of a three-dimensional image useful for map making and finds applications in constructing changes in an area as a function of time.

Applications of embodiments of the present invention include agricultural forecasting, environmental monitoring, forensics, intelligence gathering, object detection (including detection of camouflaged objects using three-dimensional data), target acquisition, remote mapping, and the like. For example, archived two-dimensional color images, made with a monocular camera and other equipment not intended for map making, can be used to determine three-dimensional information about terrain. Photometric stereo approaches can be used at large object distances, such as those distances above which binocular stereo can be used with conventional equipment.

Images may include photographs (including postcards), television images, infrared spectral images, ultraviolet spectral images, x-ray spectral images, microwave spectral images, and other images recorded with no optimization for three-dimensional information. The image is analyzed for three-dimensional information and illumination information valuable for reasons not foreseen by the individuals originally recording the image.

Image formation associated with an image may be used in an inventive method but is not required. Such image formation data associated with an image illustratively includes imaging device data (sensitivity parameters for the film and/or imaging device (such as a camera) used to make the image, identity of imaging device, type of film, and the like), imaging condition data (time of image, such as ambient conditions at the time the image was made, solar elevation or other lighting conditions, relative solar alignment, direction of view, distance to objects imaged, altitude (of imaging device and/or objects imaged), meteorological conditions such as the presence of cloud or precipitation time of day, and the like), color correction factors, or other data associated with the image.

A surface depth profile is a useful calculated value using stereo methods. The surface depth profile is determined by equations that are presented here. Two different ways that the atmosphere impacts photometric stereo are shown: by providing illumination for passive photometric stereo imaging, and by attenuating the reflected EMR differently at different wavelengths. Effective angles of illumination for two different wavelengths (400 nm and 700 nm) are calculated from published experimental data. The utility of photometric stereo is evaluated at different ground albedos and directions of the sun for the atmospheric conditions of the published data. It is noted that the albedo of an object is a measure of how strongly the object reflects light (reflectivity) from light sources such as the Sun; defined as the ratio of total-reflected to incident electromagnetic radiation; ranging from 0 (dark) to 1 (bright). The size of the error caused by wavelength dependent scattering is estimated and the validity of the equations present are also discussed for attenuation that is strongly dependent on wavelength.

According to the present invention, the surface-height profile and illumination information are determined from a two-dimensional color image, such as film images or digital camera images made with a single view (monocular) color camera. Other image data inputs for the present invention include multiple monocular images collected that vary collection wavelengths or time of collection, thereby extending the present invention to analysis of grayscale, infrared, ultraviolet, and video imagery to glean three-dimensional features from monocular sources. In a color image, if the object was illuminated from several sources of light at different angles, the wavelength, distribution of radiances on the object surface depends both on the surface depth profile of the object and on angles of illuminating radiation at the time of the image recording. Photometric techniques are used to determine the surface depth profile of the object and angles of illuminating radiation at the time of the image recording.

Photometric methods are used in the present invention to extract stereo image information from previously recorded monocular color images, including images that were recorded with no intention of ever using them to obtain stereo imaging. The variations of height of the surface of an object relative to a background plane are also optionally calculated. This variation is defined as the height above the background plane in the image field. The variation in height, referred to synonymously as the surface depth profile of the object, is three-dimensional information, synonymously referred to as stereo information, relating to the object. Representative background planes used for height variations include a monocular image taken from an aerial perspective, for which the background plane is a generally planar ground surface and often an orthogonal plane relative to the monocular camera, or a monocular image taken from the ground, in which case the background plane is often a vertically aligned surface.

It is appreciated that while a background plane is most easily extracted as a planar surface, modeling a background plane as a contoured surface optionally is used herein to refine stereo image data extracted. The use of a contoured surface as a background plane is well suited for instances where a monocular image background has at least three points amenable to topographical indexing.

The determination of stereo information from a two-dimensional image is referred to herein as photometric imaging. Although a single view, synonymously monocular, camera is not designed to optimize the extraction of stereo image information, stereo image information is extracted from color images by mathematical processing according to the present invention.

According to the present invention, optical filters or other wavelength discriminating equipment are used to decompose a single color image into multiple component wavelength discriminated images, with the component images varying from one component image to another in intensity distribution as a function of wavelength.

Optionally, a color correction is made to the raw monocular image or a component image to account for non-uniform wavelength sensitivity of the monocular imaging device.

In a preferred embodiment, when a band pass optical filter is used for image decomposition to form component images, each of the component images obtained from the original raw monocular image corresponds to wavelength distribution associated with the passed bandwidth of the optical filter. These component images, derived from decomposition of the original raw monocular color image, are used to calculate an optical flow field. An optical flow field is defined as a field in which each point of the optical flow field is assigned a two-dimensional vector representing the optical flow. The surface depth profile is then extracted from the optical flow data. A three-dimensional image is then constructed using both the mean of the series of component images and the surface depth profile. Image decomposition is also optionally performed with successive monochromatic wavelength sources such as individual laser lines to yield monochromatic component images. With reference data as to time of raw image collection, weather conditions, and solar spectrum, further refinements in three-dimensional image extraction and in particular optical field data are obtained from monochromatic component images.

In addition to, or instead of the surface depth profile, the illumination vector(s) of an object at the time of the image recordation are also calculated from the raw color monocular image. The illumination field is optionally calculated from the three-dimensional image itself, or from the two-dimensional vector mapping defining the optical field. An illumination field is defined herein as the field where a three-dimensional vector is assigned to each point of the field, representing the direction of radiation that is illuminating the object at that point. An intensity distribution in terms of the angles describing the illumination is represented for each of the component images derived from the original color monocular image. If narrow band optical filters are used, the illumination field at each point of the image corresponds to the direction that electromagnetic radiation is propagating at that wavelength of the image.

In examples of the present invention, photometric stereo analysis is applied to an image that has already been recorded using conventional monocular color imaging. The inventive method is readily applied to archival monocular color photographs, even if the equipment used to record the photograph was not designed for stereo imaging and even if imaging conditions were not recorded for the raw color image. The term photograph includes photographic prints, negatives, slides, digital analogs thereof, infrared images, ultraviolet images, and the like.

The three-dimensional image information assists in the identification of a photographed object. The illumination distribution of the surface of the object can characterize the time of day in an outdoor photography, or the indoor lighting for an indoor photograph. Therefore, a method according to the present invention can extract historical or forensic information from a color photograph, and finds representative applications as diverse as refining agricultural crop growth estimations, estimating ice sheet thickness, and discerning camouflaged image objects in addition to those applications detailed above.

The decomposition of the color image into component images is achieved in several ways, depending on the precision and accuracy required for stereo image reconstruction. For instance, a photograph is reimaged with a digital imaging device, and a brightness distribution at different wavelengths calculated and assigned based on the type of film used. This facilitates compensating for wavelength bias in the original imaging system film of the pixel array. In instances when one or more objects depicted in a raw image has a known wavelength distribution, optionally the known wavelength distribution object is used to compensate for wavelength bias in the original imaging system film of pixel array. An example of an object with a known wavelength distribution is leaves on a tree that has a known optical absorption spectrum.

FIG. 1 is a flowchart for photometric analysis of a color image, to obtain three-dimensional information from a two-dimensional monocular raw color image. Raw image data is input at step 10. In FIG. 1, the input image data is a monocular color image. The source of the raw color image illustratively includes a database of digital images, a scanned negative, and a scanned image print from an imaging device or from another like source. The image data input at 10 optionally includes imaging condition data such as that relating to the imaging device used to form the image, imaging time, viewpoint to the object distance and the like.

It is appreciated that a set of component images may be received as image data with the component images varying in collection wavelength distributions. For instance, when the color and infrared monocular images or color filtered image sets are collected, these images are readily used as input image data and obviate the need for wavelength image decomposition. Optical flow is then determined using image set groups selected from the component images, in an analogous method to that used for the component images formed from decomposition of a single image.

Image data for three-dimensional shape analysis of the present invention is applied to archived color photographs made with single view film cameras, images from a database of digital images, and analysis of video information (for example, color television recordings, and other color video recordings made with a single view video camera). Video stills may be analyzed in a similar manner to other images. Time-dependent stereo information can be obtained from video recordings including color movies, color TV, or any other information, series of color images that vary as a function of time, and independent of classical stereographic alignment of the images to afford depth perception.

The present invention is also amenable to determination of the geometric angular distribution of illumination from archived color images made with single view digital or film cameras, color television recordings, and other color video images made with a single view video camera. Time-dependent illumination distributions can be determined from video recordings that vary as a function of time.

It is appreciated that according to the present invention, archived grayscale images recorded with several single view cameras are also operative in situations where the multiple monocular grayscale images which were collected on a media that had different color sensitivities are used as image data input. Each grayscale image collecting camera corresponds to a different distribution of wavelengths, which is known if the type of film or type of camera is known, even if the individual images are black and white. For example a distant object can be photographed by two viewers close to each other, one grayscale camera with sensitivity peaked at yellow wavelengths and the other camera having a sensitivity peaked at green wavelengths are equated to component images as image input per FIG. 1. A plurality of images is obtained, each representing a different wavelength distribution of the object.

The present invention is also operative with archived grayscale images recorded while the wavelength of the source is varying with time are used as image data input. Each moment of time corresponds to a different distribution of illumination wavelengths, which is known if the type of film or type of camera is known, even if the individual images are black and white. An example would be an image made at the same time of day but on days with different atmospheric conditions, so that the color of illumination changes. Archived geosynchronous satellite images are representative of such a source of images.

Methods according to the present invention also are operative with images containing an object with a known BRDF (Bidirectional Reflectance Distribution Function) as an image data input with the BRDF object then being used as a reference to extract information such as stereo image information of other objects in the image, illuminating wavelength information, camera sensitivity information, and atmospheric information.

If necessary, the input color image data 10 is digitized at step 12.

The wavelength distribution of the image is optionally adjusted using a color correction factor at step 14. The correction factor may, for example, be included with or determined from image formation data relating to the formation of the image. The correction factor may be input as part of the color image data in step 10, or determined from other input data. For example, an identification of the imaging device used to form the image may be used to retrieve (e.g. from a memory device) or otherwise generate the correction factor. The correction factor also is optionally generated from the uncorrected wavelength distribution of objects within the image that have a known wavelength distribution such as leaves, a known substance such as a rock, mineral or ice. Color correction is optional and used as a three-dimensional output image refinement.

The color image is decomposed into multiple component images, the component images distinguished from one another by different wavelengths being used to form the component images at step 16. The result of the image decomposition is a plurality of two-dimensional component images, each component image corresponding to a different wavelength distribution of the original image. The component images are each independently constructed from a wavelength band or a monochromatic wavelength.

The image decomposition of step 16 is achieved in several ways. A digital image may be separated into a plurality of narrow band color images using digital processing. A photograph may be decomposed using narrow band optical filters, wavelength discriminating photo detectors or monochromatic wavelengths. It is appreciated that step 16 is optionally performed in concert with the digitization step 12 or the input stage 10.

The optical flow (O.F.) for groups (such as pairs) of component images, synonymously referred to as sub-images, is then calculated at step 18. In examples such as where a large sequence of component images exists, a three-dimensional vector is optionally determined for each point in the image field.

The surface depth profile for each point within the image field is calculated at step 20 from the optical field (O.F.) analysis at step 18. The stereo (three-dimensional) image information, including information from two-dimensional image decompositions and surface depth profile, is calculated at step 22. The stereo information determined at step 22 is optionally output as a single or series of stereo images 24.

The illumination vectors, namely the three-dimensional vectors describing intensity and direction of flux at every wavelength and every point on the surface of the stereo image 24, are optionally calculated at step 28 and used to generate illumination distribution direction information as an output at step 30. The process of steps 26 and 28 are optional image refinements to improve resolution and are typically performed if the stereo images 24 are deemed to provide less information than desired.

Figure 2:
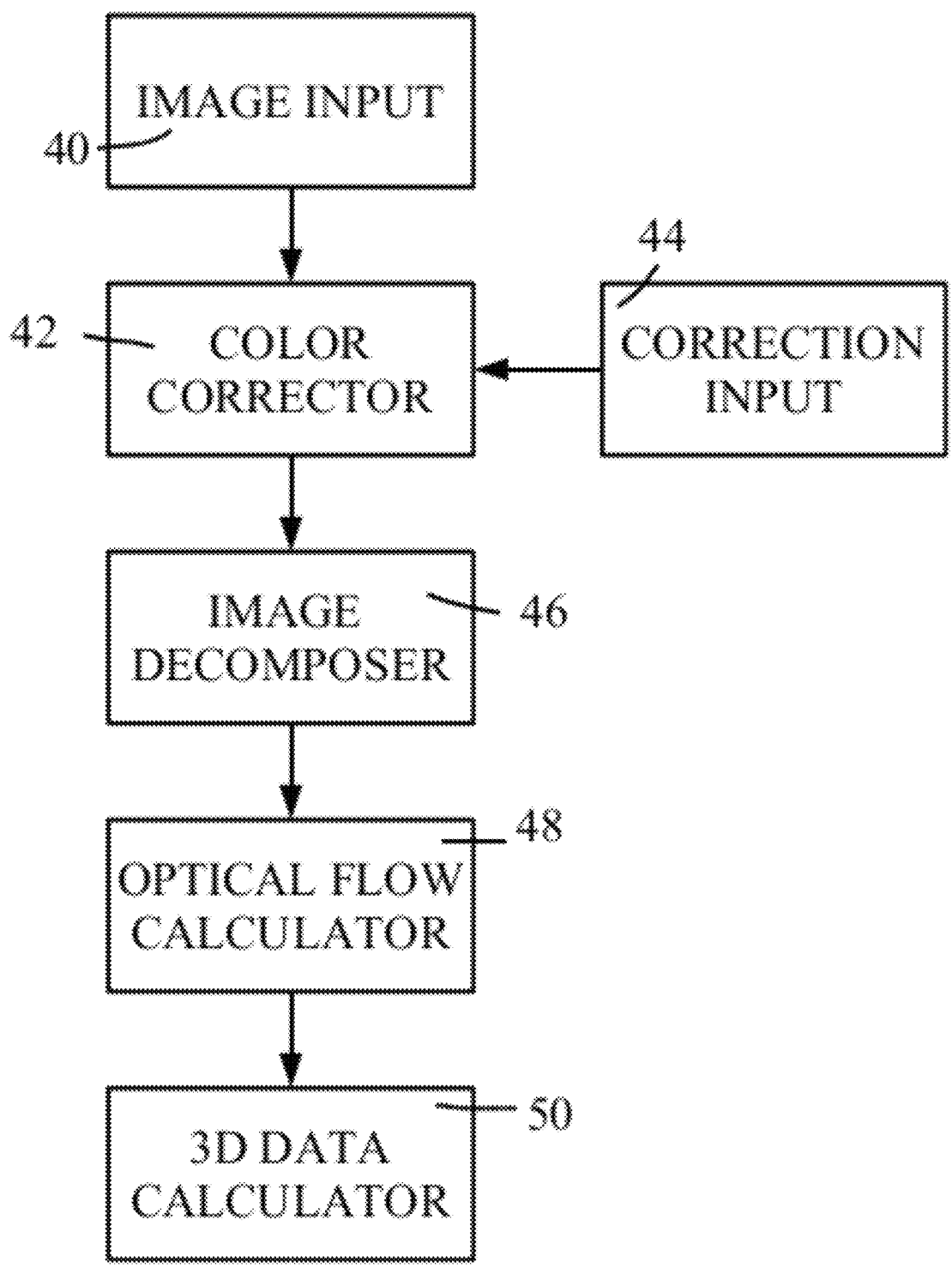
FIG. 2 is a schematic of an apparatus according to an embodiment of the present invention.

FIG. 2 shows a schematic of an apparatus according to the present invention. The apparatus includes an image input 40, a color corrector 42, an image correction input 44, an image decomposer 46, an optical flow calculator 48, and a three-dimensional (3D) data Calculator 50.

The image input 40 is a scanner, other imaging device such as a digital camera used to image a printed photograph of an object, a camera, a data link to a camera used to directly image an object, a database of images, or a video camera. The image input optionally includes an additional data input, such as a keyboard, wireless receiver, or other data input, through which image formation data associated with an image is received. Image formation data illustratively includes imaging device data, imaging condition data, or other data associated with the image.

The color corrector 42 is optionally used to act to correct the color balance of the input image. This is achieved by an automated process, for example an algorithm, or by manual balancing of pixels. The color corrector 42 optionally is placed before the image input, to act as a filter. It is appreciated that the color corrector 42 may be omitted, or combined with the image input 40, for example as a software correction to spectral response, which is applied by electronic circuitry within the image input.

The image correction input 44 operates in communication with a database of color correction factors, from which a correction factor linked to the identity of the imaging device used to provide the image can be retrieved. The image correction input 44 is optional and provides output refinement as desired.

The image decomposer 46 is implemented entirely in software, for example using image processing software. The image decomposer 46 is optionally combined with the image input 40, for example allowing input of component images with different spectral responses, for example by filtering the image before input. In this case, the image decomposer 46 includes a number of color filters used in association with an image input 40 such as a scanner. It is appreciated that an image may be scanned at different wavelength ranges, or with a polychromatic band pass set of wavelengths or a monochromatic wavelength.

An optical flow calculator 48 is a conventional algorithm operating on a computer.

Optical Flow Calculations

Any appropriate method can be used to calculate optical flow, including that described in B. K. P. Horn and B. G. Schunk, "Determining Optical Flow," *MIT Artificial Intelligence Laboratory*, 572, 0-27 (1980), hereby incorporated by reference. Any appropriate method can be used to calculate surface depth profile from the optical field, including the methods described in J. R. A. Torreão and J. L. Fernandes, "Matching photometric stereo images", *J. Opt. Soc. Am.*, A15(12), 2966-2975, (1998) and J. R. A. Torreão, "Natural Photometric Stereo," *Anois do IX Sibgrabi*, 95-102 (October 1996), both of which are hereby incorporated by reference.

Further discussion of optical flow calculations are given below. A three-dimensional data image calculator 50 is an algorithm operating on a computer with the data extracted from a monocular view, using a sequence of two-dimensional images from which optical flow is calculated. The sequence of images can be generated from a single original image, by decomposing the image into multiple component images of different wavelength distributions, or the sequence of two-dimensional images is also readily formed by imaging an object under different conditions, as discussed in more detail below.

As used in the following claims, optical flow is defined as the apparent velocity of a localized region on the image, and can be calculated from two (or more) component images of different wavelength. These component images can be formed from the decomposition of a single color image, a single black-and-white image, or from multiple images obtained under different illumination conditions.

Optical flow data at a coordinate, and an image at a particular wavelength, are defined by a pair of equations for the two components:

$$D_x(x, y, \xi) = \frac{dx}{d\xi}$$

$$D_y(x, y, \xi) = \frac{dy}{d\xi}$$

where $D_x$ is the x-component of optical flow, $D_y$ is the y-component of the optical flow, $\xi$ is the wavelength of the image, and the spatial coordinates of the brightness element on the object are designated by the coordinates x and y. The expression "brightness element" is used here in analogy to "fluid element," because the mathematics of optical flow is analogous to fluid flow where the wavelength, in optical flow is analogous to time, t, in fluid flow.

The optical flow at each image point x and y can be calculated using two consecutive images that can be described as brightness value matrices. The brightness element is defined so that its brightness is constant in wavelength. The rate that brightness changes with respect to wavelength is zero, which means $$\frac{dE(\vec{s})}{d\xi} = 0$$

where E is the brightness of the element at point $\vec{s} = x\hat{n}_x + y\hat{n}_y$, and the wavelength is $\xi$.

The chain rule of differentiation applies to the rate of changing brightness. A continuity condition can be derived from the chain rule and expressed by:

$$\frac{\partial E}{\partial x}\frac{dx}{d\xi} + \frac{\partial E}{\partial y}\frac{dy}{d\xi} + \frac{\partial E}{\partial \xi} = 0$$

where the partial derivatives of the brightness are $$E_x = \frac{\partial E}{\partial x},$$

$$E_y = \frac{\partial E}{\partial y}, \text{ and}$$

$$E_\xi = \frac{\partial E}{\partial \xi}.$$

The condition of continuity is a constraint necessary to specify a unique solution to the surface depth. However, condition of continuity is insufficient to calculate a unique solution to the optical flow. The perceived direction of optical flow will always be in the direction parallel to the gradient of brightness. If the optical flow component that is parallel to the brightness gradient in the xy-plane is designated as $\vec{D}_{xy}$, where $$\vec{D}_{xy} = D_x \hat{n}_x + D_y \hat{n}_y,$$

then the continuity condition can be shown to be equivalent to $$\vec{D}_{xy} = -\frac{E_\xi}{\sqrt{E_x^2 + E_y^2}} \hat{n}_{xy}$$

where $\hat{n}_{xy}$ is a normalized vector parallel to the gradient of brightness on the image (i.e., xy) plane.

In a photometric stereo method, at least two images are used to calculate the surface depth value, designated z, of a perceived three-dimensional object. The slopes of the surface depth on the perceived object are then defined by p and q where $$p = -\frac{\partial z}{\partial x} \text{ and}$$

$$q = -\frac{\partial z}{\partial y}.$$

The components p and q are proportional to $|D_x \hat{n}_x + D_y \hat{n}_y|$, which is the magnitude of the optical flow. The component of optical flow, $\vec{D}$, that is perpendicular to the brightness gradient, $\vec{E}$, cannot be determined without another constraint. Constraints are necessary to determine a unique optical flow, which is necessary to calculate a unique surface depth function. Both analytical and numerical algorithms are available for calculating the optical flow.

For example, methods of calculating optical flow were developed by Horn and Schunk. See, Horn & Schunk, "Determining Optical Flow," MIT Artificial Intelligence Laboratory Memo, 572, 0-27 (1980). The constraint used in this example was the smoothness constraint, which limits the motion of the image in a way that the image can be visualized as sliding on the surface of the object being imaged.

The equations for optical flow can solved using numerical methods, for example described below. To digitize E, $D_x$, and $D_y$, integer values are assigned to x, y and $\xi$, so x→j; y→i; and $\xi$→k where i, j, k=0, . . . , $N_{x,y,z}$. The local partial derivatives of $\vec{E}$ are averaged for a cube of adjacent values of i, j, and k by $$\bar{E}_x = \frac{1}{4}\{(E_{i,j+1,k} - E_{ijk}) + (E_{i+1,j+1,k} - E_{i+1,j,k}) + (E_{i,j+1,k+1} - E_{i,j,k+1}) +$$

$$(E_{i+1,j+1,k+1} - E_{i+1,j,k+1})\}$$

$$\bar{E}_y = \frac{1}{4}\{(E_{i+1,j,k} - E_{ijk}) + (E_{i+1,j+1,k} - E_{i,j+1,k}) + (E_{i+1,j,k+1} - E_{i,j,k+1}) +$$

$$(E_{i+1,j+1,k+1} - E_{i,j+1,k+1})\}$$

$$\bar{E}_\xi = \frac{1}{4}\{(E_{i,j,k+1} - E_{ijk}) + (E_{i+1,j,k+1} - E_{i+1,j,k}) + (E_{i,j+1,k+1} - E_{i,j+1,k}) +$$

$$(E_{i+1,j+1,k+1} - E_{i+1,j+1,k})\}$$

where $\bar{E}_x$, $\bar{E}_y$, and $\bar{E}_\xi$ are the average values of $E_x$, $E_y$, and $E_\xi$, respectively, at a point designated by i, j, and k.

The optical flow, $D_x$ and $D_y$, can be calculated from the averaged derivatives by an iterative algorithm, for example one described by Horn and Schunk. Below, the terms $D_x$ and $D_y$ are reassigned as u and v to match the nomenclature of that article. If $$\bar{u}_{ijk}^{(n)} = \frac{1}{6}\{u_{i-1,j,k}^{(n)} + u_{i,j+1,k}^{(n)} + u_{i+1,j,k}^{(n)} + u_{i+1,j,k}^{(n)}\} +$$

$$\frac{1}{12}\{u_{i-1,k-1,k}^{(n)} + u_{i-1,j+1,k}^{(n)} + u_{i+1,j+1,k}^{(n)} + u_{i+1,j-1,k}^{(n)}\}$$

u(n) and v(n) represents the calculated value for u and v at a point designated by integers i, j, and k, where n designates a step of the iteration, then the (n+1) step is $$u^{(n+1)} = \bar{u}^{(n)} - \bar{E}_x[\bar{E}_x \bar{u}^{(n)} + \bar{E}_y \bar{v}^{(n)} + \bar{E}_\xi]/[\delta^2 + \bar{E}_x^2 + \bar{E}_y^2]$$

$$v^{(n+1)} = \bar{v}^{(n)} - \bar{E}_y[\bar{E}_x \bar{u}^{(n)} + \bar{E}_y \bar{v}^{(n)} + \bar{E}_\xi]/[\delta^2 + \bar{E}_x^2 + \bar{E}_y^2]$$

where $\bar{u}^{(n)}$ and $\bar{v}^{(n)}$ are the averaged values of the optical flow components at iteration n and $\delta^2$ is an input parameter less than or equal to $\bar{E}_x^2 + \bar{E}_y^2$. The numerical parameter, $\delta^2$; partially compensates for computational noise in $\bar{E}_x$, $\bar{E}_y$, and $\bar{E}_\xi$. The input parameter, $\delta^2$, has a small value ($0 \leq \delta^2 \leq \bar{E}_x^2 + \bar{E}_y^2$) that should be set at greatest accuracy to the anticipated noise value of $\bar{E}_x^2 + \bar{E}_y^2$. However, the iterative algorithm will converge eventually even for $\delta^2 = 0$.

The values of $u^{(n+1)}$ and $v^{(n+1)}$ do not depend on $u^{(n)}$ and $v^{(n)}$, but do depend on their averaged local values $\bar{u}^{(n)}$ and $\bar{v}^{(n)}$ calculated by the following weighted averaging formulas:

$$\bar{v}_{ijk}^{(n)} = \frac{1}{6}\{v_{i-1,j,k}^{(n)} + v_{i,j+1,k}^{(n)} + v_{i+1,j,k}^{(n)} + v_{i+1,j,k}^{(n)}\} +$$

$$\frac{1}{12}\{v_{i-1,j-1,k}^{(n)} + v_{i-1,j+1,k}^{(n)} + v_{i+1,j-1,k}^{(n)}\}$$

If $E_{ijk}$ is, for each k, an $N^{i+1}$ by $N^{j+1}$ matrix (i.e., i=0, 1, 2, 3; $N_i$ and j=0, 1, 2, 3; . . . , $N_j$), then the optical flow at each k is an $N_i$ by $N_j$ matrix.

The initial values (n=0) of the optical flow components can be chosen as zero, $\bar{u}_{ijk}^{(0)} = \bar{v}_{ijk}^{(0)} = 0$, although a better initial value may facilitate convergence. The constants ⅙ and 1/12 were chosen to optimize convergence using a cube of local values determined by the two images at different wavelengths designated by integers k and k+1.

Optical flow techniques can be used to determine three-dimensional data from two-dimensional image data, including archived images.

Figure 3:
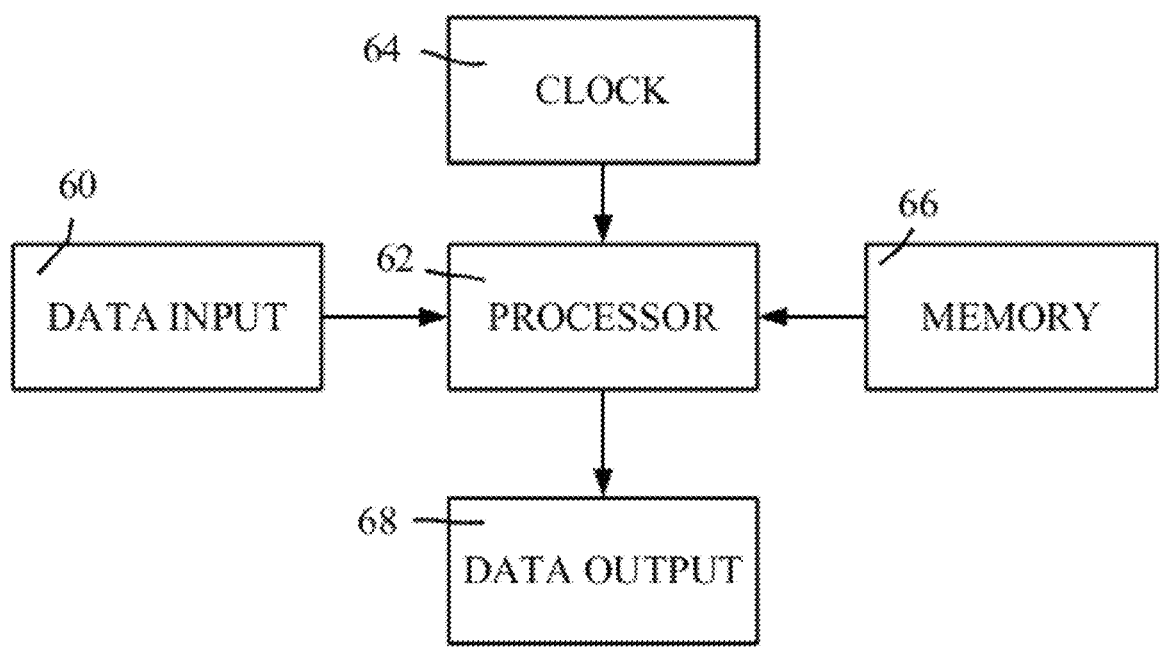
FIG. 3 is a schematic of a computer-based apparatus.

FIG. 3 illustrates a computer-based system that can be used in apparatus according to embodiments of the present invention. A computer processor unit 62, synonymously referred to as a processor, receives data from data input 60. The processor 62 is also in communication with clock 64 and memory 66. Software, such as one or more algorithms of 48 or 50, is executed by the processor 62 to generate the three-dimensional data, namely stereo images 24, which are sent to data output 68 for display as a topographical mapping, stereo image, or similar output. The data output 68 may be a screen, removable memory device, communications link to a memory 66 or other data storage device 68.

Atmospheric Effects and Other Approaches

A preferred embodiment of the present invention allows three-dimensional data to be determined from a single view direction, an approach which may be termed photometric stereo imaging. In other embodiments, several wavelengths at different illumination angles may be collected.

Photometric stereo imaging typically uses natural sources of light, such as sunlight or starlight, which are usually multiwavelength. Electromagnetic radiation (EMR) that is scattered from the atmosphere provides different angular distributions for different wavelengths, which can be used to acquire stereo information (i.e., three-dimensional data). A wavelength distribution of directions characterizes EMR sources for photometric stereo imaging.

Both the angular distribution of intensity at different wavelengths and the atmospheric attenuation have a dependence on atmospheric conditions that may impact a photometric imaging application.

The unaided eye partially uses photometric stereo methods of depth profiling, in addition to binocular stereo methods, to acquire depth perception. Realistic presentation of images as perceived by the unaided eye is needed in visualization software and other applications. A surface depth profile can be determined using the optical flow approach discussed herein.

The atmosphere modifies illumination of an object and directly attenuates the reflected EMR differently at different wavelengths. Effective angles of illumination for two different wavelengths (400 nm and 700 nm) can be calculated from published experimental data.

The utility of photometric stereo was evaluated at different ground albedos and directions of the sun for the atmospheric conditions of the published data. The size of the error caused by wavelength dependent scattering is estimated and the validity of the equations present is also discussed for attenuation that is strongly dependent on wavelength.

Illumination angle distributions that change with wavelength have effective viewing angles that can be calculated as functions of wavelength. An example using radiance profiles from atmospherically scattered EMR (at wavelengths 400 nm and 700 nm) is shown sufficient to calculate effective viewing directions. Although the example shown below is for a specific set of atmospheric conditions, variations in angle distributions and the resulting photometric stereo effects likewise vary with other atmospheric conditions.

A method of determining surface depth profile is now described, assuming that the images come from two wavelengths illuminating the three-dimensional object in two different directions. For example, images may correspond to illumination at different times of day. The angular and wavelength distribution in the atmosphere allows EMR (electromagnetic radiation) scattered in the atmosphere to provide illumination that can be used in photometric imaging.

The surface depth profile of a material in the atmosphere can be calculated using optical flow from the brightness values of two flat images acquired through the atmosphere.

The surface depth profile is extracted from optical quantities other than the angle of the point of view. The surface depth is also optionally extracted from the differential polarization. Polarimetric stereo imaging can also extract stereo information from an object. However, most natural sources of EMR are unpolarized and the degree of polarization after emission is de minimus.

Natural EMR usually has a broad wavelength spectrum. Furthermore, small increments in wavelength are easier to distinguish than small increments in polarization angle. Therefore, photometric stereo imaging is often superior to polarimetric imaging when the polarization background or random noise is large.

The smoothness condition and the continuity condition are together sufficient for specifying the solution to the surface depth profile. The constraint of smoothness can be visualized as the image sliding over the surface of the object being imaged. The constraint on smoothness is mathematically described as the object from one wavelength to the other being transformed by a local rotation by a small angle followed by a translation in a direction perpendicular to the axis of the image, which is mathematically expressed in the smoothness transformation, $$\Delta \vec{R} = \vec{\theta} \times \vec{R} + V\hat{n}_s$$

where $$\Delta \vec{R} = D_x \hat{n}_x + D_y \hat{n}_y + D_z \hat{n}_z$$

$$\vec{\theta} = A\hat{n}_x + B\hat{n}_y + C\hat{n}_z;$$

and $$\vec{R} = x\hat{n}_x + y\hat{n}_y + z\hat{n}_z$$

$\vec{R}$ is the position of a point on the three-dimensional object being image, the unit vector $\hat{n}_z$ is a displacement of the two-dimensional image perpendicular to the image plane, and both V and $D_z$ are correction factors that do not directly affect the orthographic projection (i.e., the parameters that determine the surface depth profile).of optical flow. The z-axis component of the coordinate system origin relative to the image plane determines both $D_z$ and V, although $D_z$ and V are not part of the surface depth profile. To be a true rotation, the magnitudes of the two intensities should be equal and can be expressed as $$|\vec{R}| \approx |\vec{R} + \Delta \vec{R}|$$

which is only valid if $|\vec{\theta}|$ is small (i.e., $|\vec{\theta}| \ll 1$). The equation for the surface of the object can be mathematically described using a function S such that:

$$S(x,y,z)=0$$

The normal to the surface of the object is then the gradient of S (i.e. $\vec{\nabla} S$), where $$\vec{\nabla} S = \frac{\partial S}{\partial x}\hat{n}_x + \frac{\partial S}{\partial y}\hat{n}_y + \frac{\partial S}{\partial z}\hat{n}_z$$

The unit vector in the direction of the gradient of S is designated by the normal vector, $\hat{n}_G$, $$\hat{n}_G(x,y) = \frac{1}{\sqrt{p^2+q^2+1}}(-p\hat{n}_x - q\hat{n}_y + 1\hat{n}_z)$$

where p and q are defined the same as in the definition of optical flow, $$p = -\frac{\partial z}{\partial x}$$

and $$q = -\frac{\partial z}{\partial y}$$

The smoothness condition, where the image is sliding over the surface of an object as a function of wavelength, is mathematically described by the optical flow being orthogonal to the unit vector normal to a surface of the object. A smoothness equation that mathematically describes this condition is $$\Delta \vec{R}(x,y,z) \cdot \hat{n}_G(x,y,z) = 0$$

An analytic solution to the surface depth profile was derived using the smoothness constraint. The equations for finding the surface depth with the constraint for values of $(x\hat{n}_x + y\hat{n}_y) \neq 0\hat{n}_G$ is $$\Delta z(x, y) = \frac{D_x x + D_y y}{Bx - Ay}$$

and if both coordinates are zero (i.e., $(x\hat{n}_x + y\hat{n}_y) = 0\hat{n}_G$), $$\Delta z = \frac{D_x + D_y}{B - A}$$

If V is unknown, the analytical solution for $\Delta z$ requires as input data A and B. The analytical solution is also sensitive to computational noise and is especially difficult to calculate for $0 \approx Bx - Ay$.

The equations presented up to the smoothness equation are sufficient to calculate the surface depth profile, $\Delta z$, if $\vec{\theta}$ known. There are four scalar unknowns (A, B, C, V) and only three linear equations defined by the transformation so that the position of a point on the object is not completely specified by the two conditions (continuity and smoothness) described so far. The actual z-axis component of a the position point on the object is given by z where $$z(x,y) = z_0 + \Delta z(x,y)$$

where $z_0$ is an arbitrary real number. The constant $z_0$ does not affect the stereo image shape, which is characterized by $\vec{R} - z_0 \hat{n}_z$ where $$\vec{R} - z_0 \hat{n}_z = x\hat{n}_x + y\hat{n}_y + \Delta z \hat{n}_z$$

rather than $\vec{R}$ that contains both object shape and object position information.

The arbitrary constant $z_0$ does specify the values of V, $D_z$, and $\vec{\theta}$. Therefore, V is a function of z. However, $z_0$ can be chosen so that if $z = z_0$ (i.e., $\Delta z = 0$), then V=0, which when substituted into the smoothness equation determines the z-component of optical flow as a function of the other components. Therefore, if $z_0$ is chosen so that V V($z_0$)=0, and $\Delta z \ll z_0$; then $$D_z \approx D_x p + D_y q$$

When V and $D_z$ are substituted into the smoothness transformation, a cross product formula results as expressed by $$\Delta \vec{R} \approx \vec{\theta} \times \vec{R}$$

for V($z_0$)=0, and $\Delta z \ll z_0$.

If $|\vec{\theta}| \ll 1$, the cross product formula represents a rotation which isn't followed by a translation.

The value of $z_0$ where V=0 characterizes the distance between viewer and object. The vector $\vec{\theta}$ at this $z_0$ characterizes the illumination directions on the object. There are three scalar unknowns and three linear equations equivalent to the cross product shown for this choice of $z_0$. If these equations are not singular, then there is a unique solution to $\vec{\theta}$.

The illumination directions are characterized by the rotation vector $\vec{\theta}$, which is determined by the equation of motion for the image, where the $\hat{n}_z$ component is now known. The vector $\vec{\theta}$ that determines effective illumination angles for each wavelength can be calculated after the surface depth profile is specified. The cross product can be expanded out in vector for, $$D_x \hat{n}_x + D_y \hat{n}_y + (D_x p + D_y q)\hat{n}_z = (A\hat{n}_x + B\hat{n}_y + C\hat{n}_z) \times (x\hat{n}_x + y\hat{n}_y + z\hat{n}_x)$$

This equation has three unknowns (A, B, C) and three independent equations. The solution to $\vec{\theta}$ is given by:

$$A = \frac{1}{y(x^2 - z^2)}\{D_x xy + D_y y^2 + (D_x p + D_y q)xy\}$$

$$B = \frac{1}{y(x^2 - z^2)}\{D_x x^2 + D_y xy + (D_x p + D_y q)yz\}$$

$$C = \frac{-z}{y(x^2 - z^2)}\{D_x y + (D_x p + D_y q)x\}$$

A unique solution to $\vec{\theta}$ can be found if and only if $|x| \neq |z|$ and $|y| \neq 0$.

The equation for $\Delta z$ for $(x\hat{n}_x + y\hat{n}_y) \neq 0\hat{n}_G$ discussed previously is singular for Bx−Ay=0, so that the function $\Delta z$ does not have to be smoothly differentiable at Bx−Ay=0. However, the limit as Bx→Ay can be found by substituting A, B, and C by their solution equations in Bx−Ay=0. Substitution of the equations for A, B, C, and $(D_x p + D_y q)$ into Bx−Ay=0 results in either $E_{\vec{\xi}} = D_x = D_y = 0$ or x=y. In either case, $$\lim_{Bx \to Ay} \Delta z = \frac{D_x + D_y}{B - A}$$

A special case of this limit is when $E_{\vec{\xi}} = D_x = D_y = 0$ and $A \neq B$, under which the surface is flat (i.e., $\lim_{Bx \to Ay} \Delta z = 0$) at the point designated by $(x\hat{n}_x + y\hat{n}_y)$.

A, B, and C characterize the directions of illumination. The mathematical method of analyzing photometric stereo is capable of extracting both the surface depth profile and the effective angles of illumination, but not the distance between object and viewer.

Finite difference equations for $\Delta z$ have been developed as part of the present invention from the differential equations described so far and are less sensitive to computational noise than conventional differential equations. The condition of smoothness implies that after digitization there will not be large differences in the change of objects as a function of light wavelength or that a normalization procedure has eliminated large differences.

Digitizing these continuum equations results in finite difference equations with series that converge to the analytical quantities that relate to stereo imaging. The following iterative equation converges to the analytical solution of surface depth profile, $\Delta z$. The iteration of step n>0 is calculated using the surface profile series that can be written as:

$$\Delta z^{(n)}(\vec{s}) = \Delta z^{(0)}(\vec{s}) + \left[ D_x(\vec{s}) \bar{p}^{(n-1)}(\vec{s}) - D_y(\vec{s}) \bar{q}^{(n-1)}(\vec{s}) \left( \frac{D_x(\vec{s})x + D_y(\vec{s})y}{|D_x(\vec{s})|^2 + |D_y(\vec{s})|^2} \right) \right]$$

for every $\vec{s} = j\hat{n}_x + i\hat{n}_y + k\hat{n}_z$. The initial value of the surface depth profile, $z^0(x,y)$, can be chosen as $$\Delta z^{(0)}(\vec{s}) = \left[ \overline{E}(\vec{s}) - \overline{E}_\varepsilon(\vec{s}) \frac{D_x x + D_y y}{|D_x(\vec{s})|^2 + |D_y(\vec{s})|^2} \right]$$

The $z^{(n)}$ term can be evaluated only if the local averages of p and q are calculated. The local average derivatives of the surface depth (i.e., p and q) can be calculated at each step, n, of the iteration by $$\overline{p}^{(n)} = \frac{1}{4} \{ (z^{(n)}_{i,j+1,k} - z^{(n)}_{ijk}) + (z^{(n)}_{i+1,j+1,k} - z^{(n)}_{i+1,j,k}) +$$
$$(z^{(n)}_{i,j+1,k+1} - z^{(n)}_{i,j,k+1}) + (z^{(n)}_{i+1,j+1,k+1} - z^{(n)}_{i+1,j,k+1}) \}$$

$$\overline{q}^{(n)} = \frac{1}{4} \{ (z^{(n)}_{i+1,j,k} - z^{(n)}_{ijk}) + (z^{(n)}_{i+1,j+1,k} - z^{(n)}_{i,j+1,k}) +$$
$$(z^{(n)}_{i+1,j,k+1} - z^{(n)}_{i,j,k+1}) + (z^{(n)}_{i+1,j+1,k+1} - z^{(n)}_{i,j+1,k+1}) \}$$

which will converge, as n increases, to values $\overline{p}$ and $\overline{q}$ while $z^{(n)}$ converges to $\Delta z$. The series will converge to the depth profile, z(i, j, k), in a number of steps equal to the maximum number, $N_m$, of columns or rows in the two images for the previously described initial conditions. A better initial value can improve the rate of convergence a great deal. For example, the series may converge in one iteration for k>2, if the initial condition is $\Delta z^0(i, j, k) = \Delta z(i, j, k-1)$.

The illumination directions are characterized by the rotation vector $\vec{\theta}$, which is determined by the equation of motion for the image, where the $\hat{n}_z$ component is now known. Once x, y, and z, $D_x$, and $D_y$ are known, then solutions to A, B, and C can be calculated from the cross product equation.

Atmospheric Scattering Effects

Atmospheric calculations can be performed to evaluate photometric stereo imaging under different conditions. Atmospheric conditions affect visualization of stereo images illuminated by the sun or other atmospheric influenced sources. Illumination of an object by two wavelengths at different angles, but viewed from a single direction, can be used to generate three-dimensional stereo of the object using surface depth profiles. Photometric stereo is useful in passive techniques because of the angular distribution of atmospherically scattered radiation. The radiance of electromagnetic radiation (EMR) scattered by atmospheric particles (i.e., the sky radiance) does not have a uniform spectrum. The spectrum changes with the direction of the sun relative to the zenith and the direction of view relative to the zenith. This changing spectrum causes some of the three-dimensional perspective seen. However, one of the most important factors influencing illumination is the angle of the sun that varies during the day.

The effective angle is shown to provide the stereo information can be obtained from two wavelengths in the example shown in FIG. 6. An object (tank 75) is imaged under two conditions; with the sun on the horizon and at zenith. Imaging occurs at two wavelengths, 400 nm and 700 nm. In other examples, other wavelengths or sun positions can be used.

The radiance of EMR scattered from the atmosphere is designated $L_A(x_A, A, t_A)$ where $x_A$ is cos θ, where θ is the polar angle of the view relative to the zenith, A is the albedo of the earth's surface, and $t_A$ is the time either when the sun is at the zenith ($t_A=0$), or the time ($t_A=1$) that the sun is on the horizon. The radiance scattered from the particles in the atmosphere as a function of angle of the point of view relative to the zenith is published in Driscoll and Vaughan, *Handbook of Optics*.

Figure 4A:
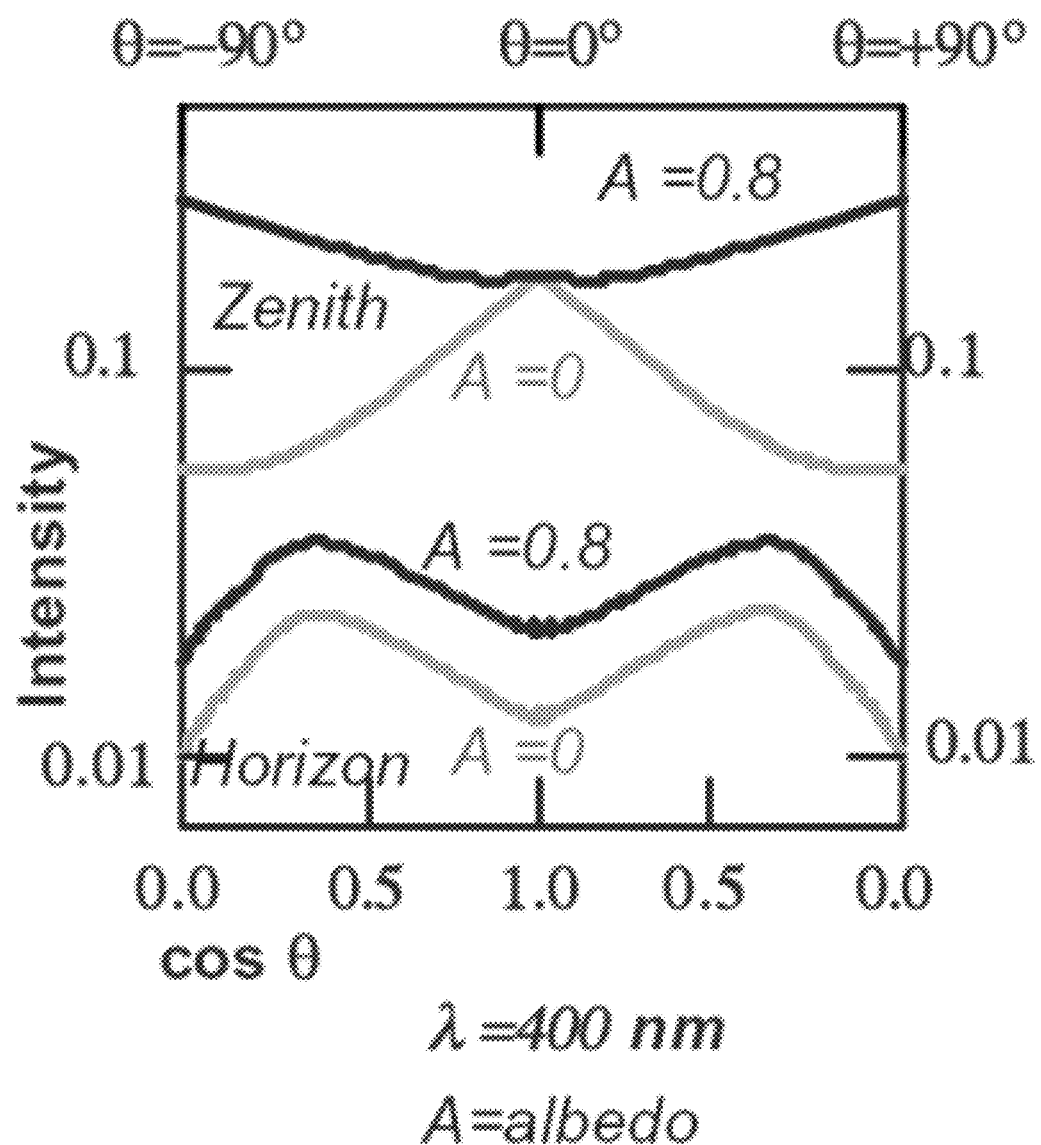
FIGS. 4A and 4B illustrate prior art intensity as a function of viewing angle at different illumination wavelengths, $\lambda$, and albedos of the earth's surface, A.
Figure 4B:
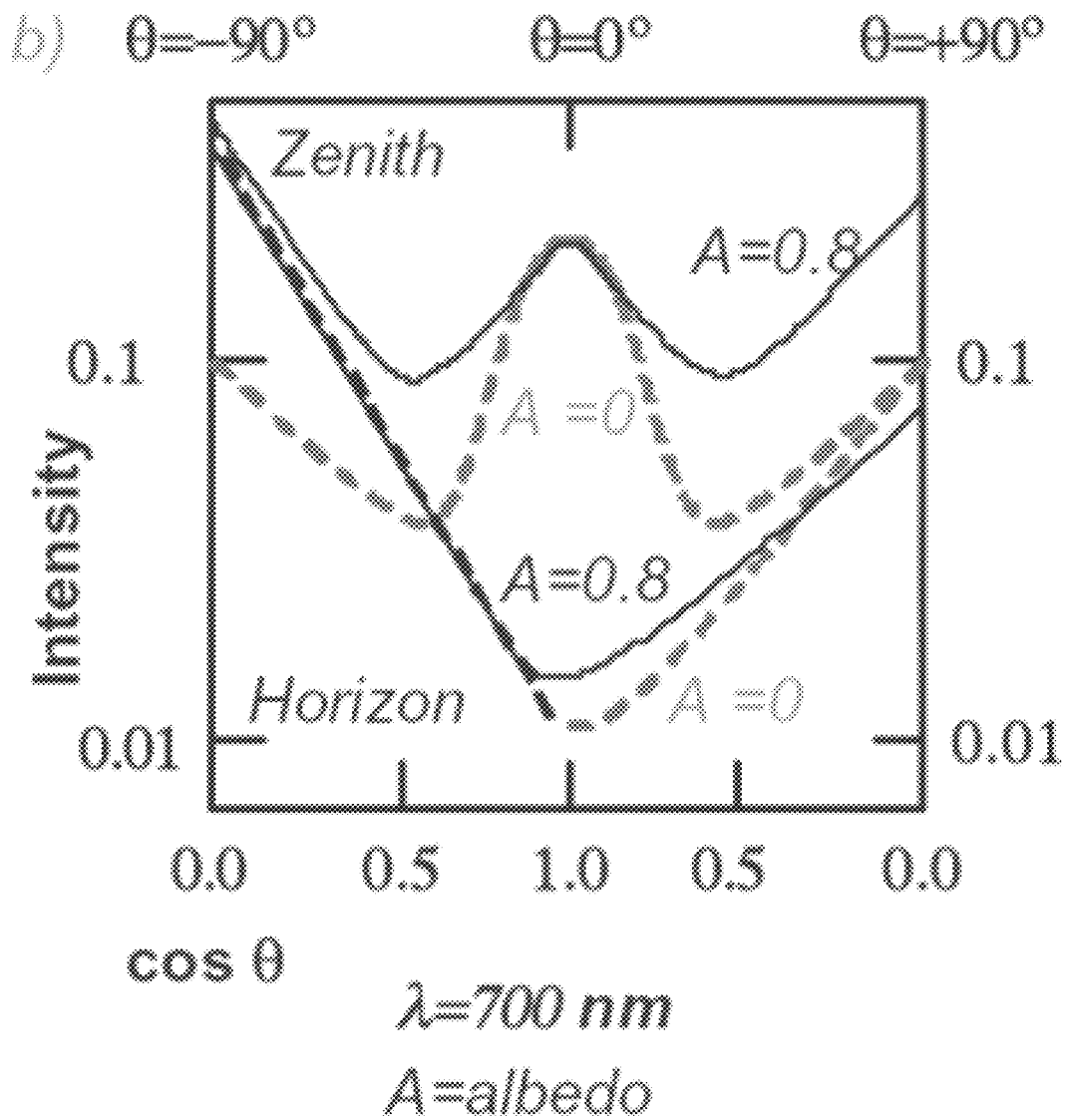

FIG. 4A shows intensity as a function of viewing angle for the sun at horizon (86.3°) and at zenith, at 400 nm, and FIG. 4B shows analogous data at 700 nm. This data is derived from J. R. A. Torreão, "Natural Photometric Stereo," Anois do IX Sibgrabi, 95-102 (October 1996), hereby incorporated by reference.

An image of an object can be obtained for each wavelength. In this example, the viewer in the analysis is facing the object from which the surface depth profile will be determined. In the cases where the sun on the horizon, the viewer is facing opposite from the sun (i.e., antisolar). The directions of illumination at each wavelength, ξ, occur at the peaks of $L_A(x_A, A, t_A, \xi)$ where the EMR is strongest. The peaks of $L_A(x_A, A, t_A)$ (i.e., angle of illumination) are determined by A and $t_A$.

The different cases provide different types of stereo information. When the sun is at the zenith ($t_A=1$), for both A=0 and A=0.8, the antisolar maximum $L_A$ occurs at cos θ=0 for wavelength 700 nm and at cos θ=0.8 at wavelength 400 nm. Furthermore, the intensity at 400 nm and 700 nm are almost equal. Therefore, the effective angles from which the object are illuminated is θ=90° at 700 nm and θ=37° at wavelength 400 nm. The difference between angles is 53°. The angle between the two effective illumination points is 53°. When the sun is on the horizon ($t_A=0$), there is more than one peak for each $x_A$ and A. Since the viewer is looking in the antisolar direction, there are broad peaks at θ=0° and 37° occur for wavelength 400 nm and two peaks, θ=0° and 90° occur at 400 nm. Since the θ=0° occurs at both wavelengths, the stereo perspective is mainly provided at θ=37° at 400 nm and 90° for 700 nm. Although these are the same angles as in the sun at zenith case, the peak at 400 nm is now broader. Therefore, the surface depth profile will not be as clearly resolved as for the zenith sun case. For the case where the ground albedo is 0.8 case and the sun is on the horizon (i.e., $t_A=1$), there is no clearly defined peak radiance for wavelength 400 nm. The radiance at wavelength 700 nm has a well defined peak at θ=0°, but there is no definite illumination direction for 400 nm. Therefore, the analysis suggests that the photometric stereo effect won't be effective under this condition.

The atmosphere also attenuates the EMR that is reflected off the object due to scattering and absorption. The attenuation from both scattering and absorption is called extinction. If the extinction does not change from with wavelength, then the images won't be substantially different from the zero extinction case. The surface depth profile can be calculated by the methods shown and will be the same as without extinction except for random noise. However, extinction is shown to add an error to the surface depth profile if the attenuation varies strongly with wavelength. At long distances, the extinction from scattering is strong enough. The error increases with the wavelength derivative of the extinction. If the error is large enough, the iterative methods described may not converge and the surface depth profile will be undefined.

Wavelength dependent extinction is shown to cause an error in the surface depth profile if the variation with wavelength is large. This can be easily seen for the special case of a very large difference in extinction coefficients where the intensity at one wavelength is attenuated to zero, and the intensity of the other wavelength is still large. Then there is no second direction of illumination and the stereo effect is not significant. In this case the surface depth profile cannot be calculated accurately. Even in a less extreme example, there is an error caused by a changing wavelength dependence that can be calculated. Wavelength dependent extinction varies with atmospheric conditions. Atmospheric extinction and scattering can be used under some atmospheric conditions to estimate the distance to a far (≈1000 m) object, although extinction can't be used to estimate surface depth profile if the features do not extend a comparable distance ($\approx$1000 m). Formulas for the error are presented herein.

Atmospheric Extinction Effects

Extinction-caused error is estimated and limits of validity for photometric stereo are analyzed in this section. The surface depth analysis is insensitive to extinction that is totally independent of wavelength. Factors that aren't $\xi$, x or y-dependent will not impact the calculation. Therefore, these $\xi$, x or y-independent factors are normalized here to one. Under the conditions of this analysis, the intensity at a viewing point $\vec{R}_1$ of a brightness element at point $\vec{R}$ is:

$$E'(x',y',z',\xi) \approx \exp(-\mu|\vec{R}'-\vec{R}|)E(x,y,z,\xi)$$

$$\vec{R}' = x'\hat{n}_x + y'\hat{n}_y + z'\hat{n}_z,$$

$$\vec{R} = x\hat{n}_x + y\hat{n}_y + z\hat{n}_z,$$

where E is the brightness at a brightness element, $\vec{R}$ is the position of the brightness element, E' is the intensity at position $\vec{R}$, $\mu$ is the extinction coefficient, and $\xi$ is the wavelength. See also Y. Yu and Jitendra Malik, "Recovering photometric properties of architectural objects from photographs," Proc. 25$^{th}$ Ann. Conf. on Computer Graphics and Interactive Techniques, 207-217 (1998), hereby incorporated by reference.

The optical flow without extinction is $|\vec{D}_{xy}|$, where $|\vec{D}_{xy}|$ is the component of optical flow in an image plane (i.e., an xy plane):

$$|\vec{D}_{xy}| = \left|\frac{E_\xi}{\sqrt{E_x^2 + E_y^2}}\right|$$

However, the optical flow will have an error caused by wavelength-dependent extinction. The optical flow with wavelength-dependent extinction is defined as:

$$|\vec{D}'_{xy}| = \left|\frac{E'_\xi}{\sqrt{E'^2_x + E'^2_y}}\right|$$

where the values E' is the brightness of an image point modified by extinction. The wavelength derivative of E is expressed by:

$$E'_\xi = \frac{\partial}{\partial \xi}\left(\exp(-\mu|\vec{R}'-\vec{R}|)E(x,y,z,\xi)\right)$$

from which the following is derived:

$$E'_\xi = \left[-|\vec{R}'-\vec{R}|\left(\frac{\partial}{\partial \xi}\mu\right)E + \frac{\partial}{\partial \xi}E\right]\exp(-\mu|\vec{R}'-\vec{R}|)$$

Substitution $E_\xi{}^t$ and E' into the definition of f' results in:

$$|\Delta\vec{D}'| = +|\vec{R}'-\vec{R}|\left(\frac{\partial}{\partial \xi}\mu\right)\frac{E}{\sqrt{E_x^2+E_y^2}} - \frac{E_\xi}{\sqrt{E_x^2+E_y^2}}$$

that can be rewritten as the equation for extinction corrected optical flow:

$$|\Delta\vec{D}'| = |\Delta\vec{R}| + |\vec{R}'-\vec{R}|\left(\frac{\partial}{\partial \xi}\mu\right)\frac{E}{\sqrt{E_x^2+E_y^2}}$$

The direction of the flow is still the direction of the gradient of E, and so remains unchanged. Therefore, the error introduced into the optical flow by the extinction is the extinction error, $\Delta$f $$\Delta|\Delta\vec{D}| = |\vec{R}'-\vec{R}|\left(\frac{\partial}{\partial \xi}\mu\right)\frac{E}{\sqrt{E_x^2+E_y^2}}$$

If the extinction coefficient, $\mu$, is independent of wavelength, $\xi$, then the error is zero ($\Delta|\Delta\vec{R}|=0$). However, the larger the change in extinction, $$\left(\frac{\partial}{\partial \xi}\mu\right),$$

then the larger the error.

The equation for extinction corrected optical flow magnitude is $$|\Delta\vec{D}'| = |\Delta\vec{R}|\left\{1 + |\vec{R}'-\vec{R}|\left(\frac{\partial}{\partial \xi}\mu\right)\frac{E}{E_\xi}\right\}$$

The x and y components of flow are proportional to the optical flow magnitude so that the optical flow modified by extinction are $D_x'$ and $D_y'$ as given by two equations, which are $$D'_x = D_x\left\{1 + |\vec{R}'-\vec{R}|\left(\frac{\partial}{\partial \xi}\mu\right)\frac{E}{E_\xi}\right\}$$

$$D'_y = D_y\left\{1 + |\vec{R}'-\vec{R}_T|\left(\frac{\partial}{\partial \xi}\mu\right)\frac{E}{E_\xi}\right\}$$

The surface depth profile modified by extinction, z', is defined by $$\Delta z'(x,y) = \frac{D'_x x + D'_y y}{Bx - Ay}$$

so that the surface depth is also proportional to the extinction modified optical flow.

$$z'(x,y) = z(x,y)\left\{1 + |\vec{R}-\vec{R}_T|\left(\frac{\partial}{\partial \xi}\mu\right)\frac{E}{E_\xi}\right\}$$

Therefore, the error z'−z is $$z' - z = |\vec{R}' - \vec{R}|\left(\frac{\partial}{\partial \xi}\mu\right)\frac{E}{E_\xi}$$

Therefore, error is surface depth is proportional to $$|\vec{R}' - \vec{R}|\left(\frac{\partial}{\partial \xi}\mu\right).$$

A large difference in extinction coefficient between two wavelengths would cause a large error in calculated surface depth for large distances, $|\vec{R}'-\vec{R}|$. However, the calculated surface depth cannot be uniquely calculated if the error is too large as is shown.

The smoothness constraint no longer applies if the error is large. This can be shown using the equation of motion, where the constant $z_0$ is chosen where V has been minimized (i.e., coordinates where V=0), $$\Delta \vec{R} = \vec{\theta} \times \vec{R}$$

which is equivalent to a rotation of the illumination direction around the $\vec{\theta}$ axis by approximately $|\vec{\theta}|$ rad for small angles ($|\vec{\theta}|\ll 1$ rad). However, the analytical solution that is also correct for large angles the transformation is a translation, not a rotation, that is tangent to a circle around $|\vec{\theta}|$ where the translation distance $\Delta y$ is $$\Delta y = |\vec{R}| \tan \phi$$

where $\phi$ is the angle of rotation about $\vec{\theta}$. This translation is equivalent to a rotation only if $\phi$ is small ($|\phi|\ll 1$). If $\Delta|\Delta\vec{R}|=0$ is too large ($1\leq\Delta|\Delta\vec{R}|\leq 2\pi$), then the angle $\phi>1$. The cross product cannot then represent a true rotation because the transformation is no longer equivalent to a rotation. Therefore, photometric stereo image conditions are not valid when the extinction varies greatly with wavelength.

Other Uses

A visualization analysis using atmospheric scattering can be used to extract stereo information at distances longer than possible with narrow view binocular stereo imaging. The impact of the atmosphere on photometric stereo images occurs both by providing or not providing the illumination in passive imaging, and by extinction where each wavelength attenuates differently.

The angular distribution of wavelength sometimes does not significantly change with wavelength such as under dense fog conditions. An estimate of where extinction is significant is made using the common observation that extremely distant objects ($\approx$1000 meters (m) under clear conditions) have a bluish tint caused by differential attenuation and atmospheric scattering. The atmosphere scatters blue light (wavelength$\approx$500 nanometers (nm)) more than red light (wavelength$\approx$600 nm), so that with distance the image grows weaker due to extinction while the scattered path radiance increases. This effect, called aerial perspective, may cause a significant error when the distance is large enough (here $\approx$1000 m) and the wavelengths extend over a wide range (here $\approx$500-600 nm). A correction for aerial perspective can be made to eliminate this error.

However, the correction for aerial perspective can also be used to measure the distance to an object, which is equivalent to $z_0$. Therefore, photometric imaging with atmospheric corrections for extinction could provide distance ($z_0$) and shape (e.g., surface depth profile) of the object being viewed.

Photometric stereo imaging only requires a sequence of two-dimensional images at different wavelengths. These images can be component images from decomposition of a color image into component images of different wavelength ranges, or may be images taken under different illumination conditions. Digital imagers can easily be modified to record such data. Mathematical algorithms for extract surface depth profiles and effective angles of illumination can be programmed into image processing software.

Natural light sources, especially atmospherically scattered light, have angular distributions of wavelength. Natural light is generally only weakly polarized, so that photometric stereo is particularly valuable where polarimetric stereo methods are not useful.

For the sun on the horizon, the angular distribution of EMR varies with wavelength as often seen by the unaided eye at sunset or sunrise. The two wavelengths are scattered from the atmosphere at distinguishable view angles, which is a condition for photometric stereo imaging. The stereo effect is less effective with the sun at zenith (high noon) because the angular distribution varies with wavelength than when the sun is on the horizon.

The effect of a nonzero albedo was to decrease the effectiveness of the photometric stereo still further. The loss in photometric stereo effect is caused by radiation diffusely reflected from the ground into the atmosphere which scatters some of the EMR back to the ground with an even broader angular distribution than radiation had before ground reflection. Therefore, a high albedo therefore creates an angular distribution that varies less with wavelength than a low albedo.

A disparity-based algorithm, such as described herein for calculation of surface depth profiles, can also be used in other situations where stereo information is needed but only one direction viewpoint is available.

The effect of dispersive (wavelength dependent) extinction is expressed in equations presented here. The error caused by dispersive extinction is proportional to the rate of change, $$\frac{d\mu}{d\xi},$$

in extinction coefficient as a function of wavelength,

Photometric stereo imaging can be used to obtain a stereo image from a single view using images, or component images decomposed from a single color image, of different wavelengths. Surface depth functions are extractable from a single view through the atmosphere using EMR scattered from atmospheric particles in a natural atmosphere. The solution to the example equations used for finding the surface depth use both an equation of continuity constraint and a smoothness constraint. A smoothness constraint can be visualized as the image is sliding on the surface of the object.

The atmosphere affects performance of photometric stereo both by providing natural illumination for passive stereo viewing and by attenuating EMR at different wavelengths. Natural illumination from atmospheric scattering provides the illumination for one approach to passive photometric stereo imaging, using images under different illumination conditions, because the angular distribution of EMR varies with wavelength. Effective angles can be calculated from published data on downwelling radiance for different times of day. Extinction effects are potentially significant if there is a large change in object brightness as a function of wavelength. Very large changes caused by extinction may invalidate the smoothness condition used in the calculation of surface depth.

Atmospheric effects on stereo images may further be included in visualization software for accurate representation of imaging.

Photometric stereo imaging can be used to extract surface depth profiles and illumination directions. The distance between the viewer and an object may be determined using any suitable technique. The calculation of optical flow from a sequence of two-dimensional images, generated from a single color image, or other images representing different wavelength ranges, allows extraction of stereo information.

Photometric techniques can further be used in real time to guide automatic and robotic devices, both under natural lighting and in cases where the surroundings are illuminated with a controlled distribution of angles and wavelengths.

As used herein the terminology signal processing circuitry includes a computer, processor, microprocessor, multiprocessor, controller, mainframe, or a plurality of computers, processors, microprocessors, multiprocessors, controller, or mainframes or equivalents thereof.

As used herein, the terminology "object" may include a thing, a person, animate or inanimate subject, a plurality of objects, the ground, ground covering (e.g., grass), a localized piece or pieces of the environment, surface, physical entity (or entities) or anything that has photoemission.

The invention is not restricted to the illustrative examples described above. Examples are not intended as limitations on the scope of the invention. Methods, apparatus, compositions, and the like described herein are exemplary and not intended as limitations on the scope of the invention. Changes therein and other uses will occur to those skilled in the art. The scope of the invention is defined by the scope of the claims. Patents, patent applications, or publications mentioned in this specification are incorporated herein by reference to the same extent as if each individual document was specifically and individually indicated to be incorporated by reference.

Having described our invention, we claim:

1. A method of determining three-dimensional data from two-dimensional image data comprising:
    inputting into signal processing circuitry at least one two-dimensional image of an object comprising different colors and/or polarizations, the at least one two-dimensional image being divisible into at least two component images having different colors and/or polarizations; such that there is a change of intensity from one component image to another,
    using signal processing circuitry, performing optical flow analysis to calculate surface depth profiles from the plurality of component two-dimensional images utilizing vectors indicating changes in intensities of color and/or polarization between the component images to calculate surface depth profiles from the plurality of component two-dimensional images; and
    resolving three-dimensional data relating to the image from the plurality of component images and surface depth profiles to create a three-dimensional surface;
    whereby different polarizations and/or colors interact with surfaces differently so that by dividing an image into component images containing different polarizations and/or colors one can derive optical flow from changes in intensities of the colors and/or polarizations.

2. The method of claim 1, wherein the at least two components have one of different colors, different polarizations or both different colors and polarizations and wherein the step of inputting at least one two-dimensional image comprises providing a plurality of component two-dimensional images by decomposing a two-dimensional polychromatic image into the plurality of component two-dimensional images of predetermined colors of the same object.

3. The method of claim 1 wherein the at least one two dimensional image is polychromatic and wherein the step of performing optical flow analysis further comprises using the surface depth profiles to calculate illumination vectors to determine the angles of light illuminating an object in the two-dimensional polychromatic image, the illumination vectors providing an illumination distribution for the object.

4. The method of claim 3, wherein the two-dimensional polychromatic image is not restricted to visible light spectrum and the at least two component images comprise one component image formed from light having a spectral band selected from the group consisting of: ultraviolet, infrared, microwave, and x-ray.

5. The method of claim 1, wherein the at least two component images comprise a plurality of grayscale component images of the object, the plurality of grayscale component images having known imaging condition data that yields a variation in wavelength distribution, the known condition data being selected from the group consisting of: time of image, ambient conditions at the time the image was made, solar elevation or other lighting conditions, relative solar alignment, direction of view, distance to objects imaged, altitude of imaging device, altitude of the objects imaged, meteorological conditions, and color correction factors.

6. The method of claim 1, wherein the optical flow analysis is performed without knowledge of the position of a camera and the step of inputting at least one two-dimensional image comprises inputting at least one two-dimensional analog image, and further comprising the step of digitizing the two-dimensional analog image which is divisible into at least two digital component images having different colors and/or polarizations.

7. The method of claim 1 further comprising outputting a stereographic pair of images of the object from the three-dimensional data.

8. The method of claim 1 wherein the at least one two-dimensional image has a wavelength distribution and further comprising the step of adjusting the wavelength distribution using a correction factor wherein the correction factor is determined from image formation data and the image formation data comprises the identity of an imaging device used to form the image and ambient condition data relating to formation of the image.

9. The method of claim 1 wherein the at least two component images are formed using different polarizations such that there is an apparent change of intensity from one image to another, such that a vector or vectors may be used to perform the optical flow analysis to calculate surface depth profiles from the at least two component two-dimensional images.

10. The method of claim 1 wherein optical flow analysis is performed using optical flow components u and v and $u^{(n)}$ and $v^{(n)}$ to represent the calculated value for u and v at a point designated by integers i, j and k, where n designates a step of the iteration, then the (n+1) step is $$u^{(n+1)} = \overline{u}^{(n)} - E_x[E_x\overline{u}^{(n)} + E_y\overline{u}^{(n)} + E_\xi]/[\delta^2 + E_x^2 + E_y^2]$$

$$v^{(n+1)} = \overline{v}^{(n)} - E_y[E_x\overline{u}^{(n)} + E_y\overline{u}^{(n)} + E_\xi]/[\delta^2 + E_x^2 + E_y^2]$$

where $\overline{u}^{(n)}$ and $\overline{v}^{(n)}$ are the averaged values of the optical flow components at iteration n and $\delta^2$ is an input parameter less than or equal to $\overline{E}_x^2 + \overline{E}_y^2$, and wherein the numerical parameter, $\delta^2$, partially compensates for computational noise in $\overline{E}_x^2$, $\overline{E}_y^2$ and $\overline{E}_\xi$ and the input parameter $\delta^2$ has a small value ($0 \leq \delta^2 \leq \overline{E}_x^2 + \overline{E}_y^2$) that should be set at greatest accuracy to the anticipated noise values of $\overline{E}_x^2 + \overline{E}_y^2$, and wherein the iterative algorithm will converge eventually even for $\delta^2 = 0$
and the value of $u^{(n+1)}$ and $v^{(n+1)}$ do not directly depend on $u^{(n+1)}$ and $v^{(n+1)}$, but depends on their averaged local values $\overline{u}^{(n)}$ and $\overline{v}^{(n)}$ calculated by the following weighted averaging formulas:

$$\overline{u}_{ijk}^{(n)} = \frac{1}{6}\{u_{i-1,j,k}^{(n)} + u_{i,j+1,k}^{(n)} + u_{i+1,j,k}^{(n)} + u_{i+1,j,k}^{(n)}\} +$$

$$\frac{1}{12}\{u_{i-1,j-1,k}^{(n)} + u_{i-1,j+1,k}^{(n)} + u_{i+1,j+1,k}^{(n)} + u_{i+1,j-1,k}^{(n)}\}$$

$$\overline{v}_{ijk}^{(n)} = \frac{1}{6}\{v_{i-1,j,k}^{(n)} + v_{i,j+1,k}^{(n)} + v_{i+1,j,k}^{(n)} + v_{i+1,j,k}^{(n)}\} +$$

$$\frac{1}{12}\{v_{i-1,j-1,k}^{(n)} + v_{i-1,j+1,k}^{(n)} + v_{i+1,j+1,k}^{(n)} + v_{i+1,j-1,k}^{(n)}\}$$

and if $E_{ijk}$ is, for each k, an $N^{i+1}+1$ by $N_{j+1}+1$ matrix (i.e., $i=0, 1, 2, 3, \ldots, N_i$ and $j=0, 1, 2, 3, \ldots, N_j$), then the optical flow at each k is an $N_i$ by $N_j$ matrix, and the initial values ($n=0$) of the optical flow components can be chosen as zero, $$\overline{u}_{ijk}^{(0)} = \overline{v}_{ijk}^{(0)} = 0$$

and the constants $\frac{1}{6}$ and $\frac{1}{12}$ are chosen to optimize convergence using a cube of local values determined by the two images at different wavelengths designated by integers k and k+1.

11. The method of claim 1, wherein said surface depth profile is calculated by iteratively solving $$\Delta z^{(n)}(\vec{s}) = \Delta z^{(0)}(\vec{s}) + \left[D_z(\vec{s})\overline{p}^{(n-1)}(\vec{s}) - D_y(\vec{s})\overline{q}^{(n-1)}(\vec{s})\left(\frac{D_x(\vec{s})x + D_y(\vec{s})y}{|D_x(\vec{s})|^2 + |D_y(\vec{s})|^2}\right)\right]$$

where $$\Delta z^{(0)}(\vec{s}) = \left[\overline{E}(\vec{s}) - \overline{E}_\xi(\vec{s})\frac{D_x x + D_y y}{|D_x(\vec{s})|^2 + |D_y(\vec{s})|^2}\right],$$

$$\vec{s} = j\hat{n}_x + i\hat{n}_y + k\hat{n}_z,$$

$$D_x\hat{n}_x + D_y\hat{n}_y + (D_x p + D_y q)\hat{n}_z = (A\hat{n}_x + B\hat{n}_y + C\hat{n}_z) \times (x\hat{n}_x + y\hat{n}_y + z\hat{n}_z)$$

when $|x| \neq |z|$ and $|y| \neq 0$, the local averages of $\overline{p}^{(n)}$ and $\overline{q}^{(n)}$ are $$\overline{p}^{(n)} = \frac{1}{4}\{(z_{i,j+1,k}^{(n)} - z_{ijk}^{(n)}) + (z_{i+1,j+1,k}^{(n)} - z_{i+1,j,k}^{(n)}) +$$

$$(z_{i,j+1,k+1}^{(n)} - z_{i,j,k+1}^{(n)}) + (z_{i+1,j+1,k+1}^{(n)} - z_{i+1,j,k+1}^{(n)}))\}$$

$$\overline{q}^{(n)} = \frac{1}{4}\{(z_{i+1,j,k}^{(n)} - z_{ijk}^{(n)}) + (z_{i+1,j+1,k}^{(n)} - z_{i,j+1,k}^{(n)}) +$$

$$(z_{i+1,j,k+1}^{(n)} - z_{i,j,k+1}^{(n)}) + (z_{i+1,j+1,k+1}^{(n)} - z_{i,j,k+1}^{(n)})\}$$

where n is a positive integer value convergent iteration, $\hat{n}_x$ indicates a unit vector in the x direction, $\hat{n}_y$ indicates a unit vector in the y direction, $\hat{n}_z$ indicates a unit vector in the z direction, $D_x$ is the x-component of the optical flow and $D_y$ is the y component of the optical flow, $D_{xy}$ is the component of the optical flow in the xy plane, $E_\xi$ is the derivative of the brightness of the field with respect to the wavelength of the image, $E_x$ is the derivative of the brightness of the field with respect to x, $E_y$ is the derivative of the brightness of the field with respect to y, $\Delta z$ is the depth profile, $\Delta z^{(n)}$ is the n-th iterate, $\Delta z^{(0)}$ is the 0th iterate (the superscripts indicating the iteration level of the particular variable), E is the brightness of the field, p is the negative of the derivative of z with respect to y, q is the negative of the derivative of z with respect to y, z is the actual z-axis component of the point on the object, the average of a variable is indicated by a bar over the variable and the subscripts i, j, k are indices in arrays containing the values of the variables that are being computed.

12. A method of determining three-dimensional data from two-dimensional image data comprising:
inputting into signal processing circuitry at least one two-dimensional image of an object comprising different colors and/or polarizations, the at least one two-dimensional image being divisible into at least two component images having different colors and/or polarizations; such that there is a change of intensity from one component image to another,
using signal processing circuitry, performing optical flow analysis to calculate surface depth profiles from the plurality of component two-dimensional images utilizing vectors indicating changes in intensities of color and/or polarization between the component images to calculate surface depth profiles from the plurality of component two-dimensional images; the optical flow at each image point being based upon a brightness element using two images of the same scene as brightness value matrices, the brightness element being defined so that its brightness is constant in wavelength and the rate that brightness changes with respect to wavelength is zero, such that $$\frac{dE(\vec{s})}{d\xi} = 0.$$

where E is the brightness of the element at point $\vec{s} = x\hat{n}_x + y\hat{n}_y$ and the wavelength is $\xi$, and
resolving three-dimensional data relating to the image from the plurality of component images and surface depth profiles to create a three-dimensional surface.

13. The method of claim 12 wherein the step of performing optical flow analysis comprises applying the chain rule of differentiation to the rate of changing brightness to derive a continuity condition $$\frac{\partial E}{\partial x}\frac{dx}{d\xi} + \frac{\partial E}{\partial y}\frac{dy}{d\xi} + \frac{\partial E}{\partial \xi} = 0,$$

where the partial derivatives of the brightness are $$E_x = \frac{\partial E}{\partial x},$$

$$E_y = \frac{\partial E}{\partial y},$$

and $$E_\xi = \frac{\partial E}{\partial \xi}.$$

14. The method of claim 13 wherein the condition of continuity is a constraint necessary to specify a unique solution to the determination of the surface depth, and the perceived direction of optical flow is based upon differences in brightness defined as brightness gradient and is determined to be in the direction parallel to the brightness gradient, and the optical flow component that is parallel to the brightness gradient in the xy-plane is designated as $\vec{D}_{xy}$, where $$\vec{D}_{xy} = D_x \hat{n}_x + D_y \hat{n}_y$$

where the xy coordinates defined the xy-plane, $\hat{n}_x$ indicates a unit vector in the x direction, $\hat{n}_y$ indicates a unit vector in the y direction, $D_x$ is the x-component of the optical flow and $D_y$ is the y component of the optical flow, then the continuity condition can be shown to be equivalent to $$\vec{D}_{xy} = -\frac{E_\xi}{\sqrt{E_x^2 + E_y^2}} \hat{n}_{xy}$$

where $\hat{n}_{xy}$ is a normalized vector parallel to the gradient of brightness on the image (i.e. xy) plane.

15. The method of claim 14 wherein the surface depth value, which may be designated as z, is calculated for a perceived 3D object and the slopes of the surface depth on the perceived object are defined by p and q where:

$$p = -\frac{\partial z}{\partial x}$$

and $$q = -\frac{\partial z}{\partial y}.$$

such that the components p and q are proportional to $|D_x \hat{n}_x + D_y \hat{n}_y|$ which is the magnitude of the optical flow and the component of optical flow, $\vec{D}$, that is perpendicular to the brightness gradient, E and wherein the components p and q are proportional to $|D_x \hat{n}_x + D_y \hat{n}_y|$ which is the magnitude of the optical flow and the component of optical flow $\vec{D}$, which is perpendicular to the brightness gradient, $\vec{E}$, is determined using a smoothness constraint, which limits the motion of the image in a way that the image can be visualized as sliding on the surface of the object being imaged, and wherein equations for optical flow can be solved such that E, $D_x$ and $D_y$ are digitized, and integer values are assigned to x, y, and $\xi$ so x→i, y→j, $\xi$→k where i, j, k=0, ..., $N_{x,y,z}$ and the local partial derivatives of t are averaged for a cube of adjacent values of i, j, and k by $$\overline{E_x} = \frac{1}{4}\{(E_{i,j+1,k} - E_{i,j,k}) + (E_{i+1,j+1,k} - E_{i+1,j,k}) +$$

$$(E_{i,j+1,k+1} - E_{i,j,k+1}) + (E_{i+1,j+1,k+1} - E_{i+1,j,k+1})\}$$

$$\overline{E_y} = \frac{1}{4}\{(E_{i+1,j,k} - E_{i,j,k}) + (E_{i+1,j+1,k} - E_{i,j+1,k}) +$$

$$(E_{i+1,j,k+1} - E_{i,j,k+1}) + (E_{i+1,j+1,k+1} - E_{i,j+1,k+1})\}$$

-continued $$\overline{E_\xi} = \frac{1}{4}\{(E_{i,j,k+1} - E_{i,j,k}) + (E_{i+1,j,k+1} - E_{i+1,j,k}) +$$

$$(E_{i,j+1,k+1} - E_{i,j+1,k}) + (E_{i+1,j+1,k+1} - E_{i+1,j+1,k})\}$$

where $\overline{E_x}$, $\overline{E_y}$, and $\overline{E_\xi}$ are the average values of $E_x$, $E_y$, and $E_\xi$ at a point designated by i, j, and k.

16. A system for determining three-dimensional data from a two-dimensional image comprising:
an image input for inputting at least one two-dimensional image of an object comprising different colors and/or polarizations, the at least one two-dimensional image being divisible into at least two component images having different colors and/or polarizations such that there is a change of intensity from one component image to another,
at least one processor for providing a plurality of component images; the at least one processor using differences in polarizations and/or colors to calculate an optical flow and a surface depth profile from the plurality of component images for producing three-dimensional data relating to the image;
whereby different polarizations and/or colors interact with surfaces differently so that by dividing an image into component images containing different polarizations and/or colors one can derive optical flow from changes in intensities of the colors and/or polarizations.

17. The system of claim 16 wherein the at least one processor comprises a band pass optical filter and wherein each of the component images obtained from the at least one two-dimensional image corresponds to wavelength distribution associated with the passed bandwidth of the optical filter and wherein the at least one processor uses component images to calculate an optical flow field in which each point of the optical flow field is assigned a two-dimensional vector representing the optical flow and a surface depth profile is then extracted from the optical flow data.

18. The system of claim 16 wherein the at least one processor comprises an image processor for providing the plurality of component images and a first processor operating to calculate an optical flow and a surface depth profile, wherein the plurality of component images is a series of component images and wherein the at least one processor determines a mean of the series of component images and wherein the system further includes a display for displaying a three-dimensional image using the mean of the series of component images and the surface depth profile.

19. The system of claim 18 wherein the image input comprises one of an optical scanner, camera or video device and wherein the image processor provides a plurality of component images produced by successive monochromatic wavelength sources such as individual laser lines to yield monochromatic component images and wherein system further comprises an input for inputting reference data comprising time of image collection, weather conditions, and solar, spectrum and wherein the optical field is obtained from monochromatic component images.

20. The system of claim 16, wherein the at least one processor comprises an image processor and wherein the image processor comprises a plurality of color filters.

* * * * *